(12) United States Patent
Hamamoto et al.

(10) Patent No.: US 10,160,289 B2
(45) Date of Patent: Dec. 25, 2018

(54) AIR CONDITIONING DEVICE FOR VEHICLE

(71) Applicants: JAPAN CLIMATE SYSTEMS CORPORATION, Hiroshima (JP); Panasonic Corporation, Osaka (JP)

(72) Inventors: Hiroshi Hamamoto, Hiroshima (JP); Kohei Fukawatase, Hiroshima (JP); Yoshihiko Otake, Hiroshima (JP); Kou Komori, Nara (JP); Subaru Matsumoto, Osaka (JP); Katsuyoshi Wakano, Osaka (JP)

(73) Assignees: JAPAN CLIMATE SYSTEMS CORPORATION, Hiroshima (JP); Panasonic Corporation, Osaka (JP)

( * ) Notice: Subject to any disclaimer, the term of this patent is extended or adjusted under 35 U.S.C. 154(b) by 479 days.

(21) Appl. No.: 14/414,876

(22) PCT Filed: Feb. 26, 2013

(86) PCT No.: PCT/JP2013/001131
§ 371 (c)(1),
(2) Date: Jan. 14, 2015

(87) PCT Pub. No.: WO2014/016981
PCT Pub. Date: Jan. 30, 2014

(65) Prior Publication Data
US 2015/0183294 A1    Jul. 2, 2015

(30) Foreign Application Priority Data

Jul. 24, 2012   (JP) .................................. 2012-164052
Jul. 24, 2012   (JP) .................................. 2012-164054

(51) Int. Cl.
*B60H 1/22*    (2006.01)
*B60H 1/00*    (2006.01)
(Continued)

(52) U.S. Cl.
CPC ..... *B60H 1/00899* (2013.01); *B60H 1/00314* (2013.01); *B60H 1/00764* (2013.01);
(Continued)

(58) Field of Classification Search
CPC ........ F25B 2313/02323; F25B 6500/26; F25B 2600/2501; F25B 2313/023;
(Continued)

(56) References Cited

U.S. PATENT DOCUMENTS 4,275,567 A * 6/1981 Schwitters ............. A23G 9/045
62/136
4,718,245 A * 1/1988 Van Steenburgh, Jr. ...................
B01D 53/265
62/196.4
(Continued)

FOREIGN PATENT DOCUMENTS

EP    2570282 A1 *  3/2013   ......... B60H 1/00914
JP    7-052631 A    2/1995
(Continued)

OTHER PUBLICATIONS

International Search Report; PCT/JP2013/001131; dated Jun. 25, 2013.

*Primary Examiner* — Ned Landrum
*Assistant Examiner* — Daniel C Comings
(74) *Attorney, Agent, or Firm* — Studebaker & Brackett PC

(57) ABSTRACT

A air conditioning control device is configured to estimate whether or not the temperature of refrigerant on a high-pressure side in a heat pump device is equal to or lower than a predetermined low temperature and to switch a flow path switching device to an air-heating start-up mode when it is estimated that the temperature of refrigerant on the high-pressure side in the heat pump device is equal to or lower
(Continued)

than the predetermined low temperature and switch the flow path switching device to a normal air-heating mode when it is estimated that the temperature of refrigerant on the high-pressure side in the heat pump device is higher than the predetermined low temperature.

2 Claims, 16 Drawing Sheets

(51) Int. Cl.
  *F25B 6/04* (2006.01)
  *F25B 5/04* (2006.01)
  *F25B 49/02* (2006.01)

(52) U.S. Cl.
  CPC ........... *B60H 1/00921* (2013.01); *B60H 1/22* (2013.01); *F25B 5/04* (2013.01); *F25B 6/04* (2013.01); *F25B 49/02* (2013.01); *B60H 2001/00928* (2013.01); *B60H 2001/2246* (2013.01); *B60H 2001/2253* (2013.01); *F25B 2313/0232* (2013.01); *F25B 2313/0234* (2013.01); *F25B 2313/02344* (2013.01); *F25B 2341/0662* (2013.01); *F25B 2400/0403* (2013.01); *F25B 2400/0409* (2013.01); *F25B 2600/2501* (2013.01); *F25B 2700/197* (2013.01); *F25B 2700/1931* (2013.01)

(58) Field of Classification Search
  CPC ...... F25B 2313/0232; F25B 2313/0234; F25B 2313/02344; B60H 1/22; B60H 1/00899; B60H 1/00764; B60H 1/00314; B60H 1/00921
  See application file for complete search history.

(56) References Cited

U.S. PATENT DOCUMENTS

| | | | |
|---|---|---|---|
| 4,969,335 A | * | 11/1990 | Sasaki ................... F25B 6/02 62/196.4 |
| 6,347,528 B1 | | 2/2002 | Iritani et al. |
| 2008/0229768 A1 | | 9/2008 | Nakamura et al. |

FOREIGN PATENT DOCUMENTS

| | | | | |
|---|---|---|---|---|
| JP | H08-99526 A | | 4/1996 | |
| JP | H09-240266 A | | 9/1997 | |
| JP | H09-295506 A | | 11/1997 | |
| JP | 2001-030744 A | | 2/2001 | |
| JP | 2001-050572 A | | 2/2001 | |
| JP | 2001-199232 A | | 7/2001 | |
| JP | 3436872 B2 | | 8/2003 | |
| JP | 2004-182109 A | | 7/2004 | |
| JP | 2004-182168 A | | 7/2004 | |
| JP | 2005-262948 A | | 9/2005 | |
| JP | WO 2010106776 A1 | * | 9/2010 | .............. F25B 13/00 |
| JP | WO 2011142244 A1 | * | 11/2011 | ......... B60H 1/00914 |
| JP | 2011-255734 A | | 12/2011 | |
| JP | 2011-255735 A | | 12/2011 | |

* cited by examiner

AIR CONDITIONING DEVICE FOR VEHICLE

TECHNICAL FIELD

The present invention relates to a vehicle air conditioner mounted on a vehicle.

BACKGROUND ART

Conventionally, e.g., air conditioners each including a heat pump device have been known as air conditioners mounted on hybrid vehicles, electric vehicles, etc. These heat pump devices for vehicles are each configured such that an electric compressor, an outdoor heat exchanger disposed outside a vehicle compartment, an expansion valve, and an indoor heat exchanger disposed inside the vehicle compartment are connected together in this order through refrigerant pipes.

For example, a vehicle air conditioner of Patent Document 1 includes, as indoor heat exchangers, an upstream indoor heat exchanger disposed upstream in an air flow direction, and a downstream indoor heat exchanger disposed downstream in the air flow direction. The downstream indoor heat exchanger serves as a radiator in both of an air-heating operation mode and an air-cooling operation mode. Moreover, the upstream indoor heat exchanger serves as a heat absorber in both of the air-heating operation mode and the air-cooling operation mode.

Strong air-heating is required for the air-heating operation mode particularly under low outdoor air temperature. However, there is a possibility that an air-heating capacity becomes insufficient when the upstream indoor heat exchanger serves as the heat absorber in the air-heating operation mode as described in Patent Document 1.

In view of the foregoing, the upstream indoor heat exchanger may also serve as the radiator in the air-heating operation mode as described in, e.g., Patent Document 2. That is, the refrigerant pipes are connected together such that refrigerant discharged from the compressor flows through the upstream indoor heat exchanger after flowing through the downstream indoor heat exchanger. This allows air heated by the upstream indoor heat exchanger to be re-heated in the downstream indoor heat exchanger, and therefore there is an advantage that the air-heating capacity can be improved. On the other hand, since depressurized refrigerant is, in the air-cooling operation mode, supplied to the upstream indoor heat exchanger to cause the upstream indoor heat exchanger to serve as the heat absorber, air-cooling can be also performed.

CITATION LIST

Patent Document

PATENT DOCUMENT 1: Japanese Unexamined Patent Publication No. H09-240266
PATENT DOCUMENT 2: Japanese Unexamined Patent Publication No. 2011-255735

SUMMARY OF THE INVENTION

Technical Problem

Air-conditioning is required in various situations. For example, there is a case where heating of air in a vehicle begins under the circumstances, such as the winter, that an outdoor air temperature is low and that refrigerant on a high-pressure side in the heat pump device is cooled to a temperature close to the outdoor air temperature due to the vehicle being left uncontrolled for a long period of time.

However, in the air conditioner of Patent Document 2, since refrigerant flows through both of the upstream and downstream indoor heat exchangers in air-heating, the total volume of a refrigerant path in the heat pump device is large. Thus, the pressure and temperature of refrigerant is sometimes less likely to increase in start-up of air-heating. As a result, the time required until warm air is supplied into the vehicle compartment is increased due to delay in start-up of air-heating. This leads to lowering of the degree of passenger's comfort.

First to fifth aspects of the invention have been made in view of the foregoing, and a first objective of the present invention is to speed up start-up of air-heating to improve the degree of passenger's comfort in the case where a plurality of heat exchangers capable of serving as radiators are provided in a vehicle compartment to achieve a high air-heating capacity.

When an air-heating operation begins under the circumstances that refrigerant on the high-pressure side in the heat pump device is cooled to the temperature close to the outdoor air temperature, the temperature of air sent to the indoor heat exchanger is low, and therefore, the temperature of refrigerant discharged from the compressor decreases due to heat exchange between the refrigerant and air while the refrigerant circulates in the indoor heat exchanger. The refrigerant whose temperature decreases is sucked into the compressor again. As a result, the pressure and temperature of refrigerant are less likely to increase upon start-up of air-heating. Accordingly, the start-up of air-heating becomes slower, resulting in a lower time required for supplying warm air into the vehicle compartment. Consequently, the degree of passenger's comfort is lowered.

Sixth to tenth aspects of the invention have been made in view of the foregoing, and a second objective of the present invention is to speed up start-up of air-heating by a heat pump device to improve the degree of passenger's comfort.

Solution to the Problem

In order to accomplish the first objective, the total volume of a refrigerant path on a high-pressure side in a heat pump device is smaller upon start-up of air-heating according to the first to fifth aspects of the invention.

The first aspect of the invention is intended for a vehicle air conditioner including a heat pump device including a compressor configured to compress refrigerant, first and second indoor heat exchangers arranged in a vehicle compartment, and an outdoor heat exchanger disposed outside the vehicle compartment, and an indoor air conditioning unit housing the first and second indoor heat exchangers, including an air blower configured to send air-conditioning air to the first and second indoor heat exchangers, and configured to generate air-conditioned air to supply the air-conditioned air into the vehicle compartment. The vehicle air conditioner includes a flow path switching device including a refrigerant inlet into which refrigerant flows from the first indoor heat exchanger, a normal air-heating refrigerant outlet connected to the second indoor heat exchanger such that the refrigerant flowing into the refrigerant inlet flows into the second indoor heat exchanger, and an air-heating start-up refrigerant outlet causing the refrigerant flowing into the refrigerant inlet to bypass the second indoor heat exchanger, and configured to switch between a normal air-heating mode in which the refrigerant flowing into the refrigerant inlet flows into the normal air-heating refrigerant outlet and an air-heating start-up mode in which the refrigerant flowing into the refrigerant inlet flows into the air-heating start-up refrigerant outlet; and an air conditioning control device configured to control the flow path switching device. The air conditioning control device is configured to cause the flow path switching device to be in the air-heating start-up mode at beginning of air-heating and then to be in the normal air-heating mode.

According to the foregoing configuration, the operation is in the air-heating start-up mode upon start-up of air-heating, and refrigerant having circulated in the first indoor heat exchanger flows so as to bypass the second indoor heat exchanger. Thus, since the total volume of the refrigerant path on the high-pressure side in the heat pump device becomes smaller, an increase in pressure and temperature of refrigerant on the high-pressure side in the heat pump device accelerates, and therefore, start-up of air-heating becomes faster. Thus, start-up of air-heating becomes faster under the circumstances, such as the winter, that an outdoor air temperature is low and that refrigerant on the high-pressure side in the heat pump device is cooled to a temperature close to the outdoor air temperature due to a vehicle being left uncontrolled for a long period of time.

Then, since the operation is switched to the normal air-heating mode, refrigerant having circulated in the first indoor heat exchanger flows through the second indoor heat exchanger. Thus, outdoor air can be heated by the first and second indoor heat exchangers, resulting in a high air-heating capacity.

The second aspect of the invention is intended for a vehicle air conditioner including a heat pump device including a compressor configured to compress refrigerant, first and second indoor heat exchangers arranged in a vehicle compartment, and an outdoor heat exchanger disposed outside the vehicle compartment, and an indoor air conditioning unit housing the first and second indoor heat exchangers, including an air blower configured to send air-conditioning air to the first and second indoor heat exchangers, and configured to generate air-conditioned air to supply the air-conditioned air into the vehicle compartment. The vehicle air conditioner includes a flow path switching device including a refrigerant inlet into which refrigerant flows from the first indoor heat exchanger, a normal air-heating refrigerant outlet connected to the second indoor heat exchanger such that the refrigerant flowing into the refrigerant inlet flows into the second indoor heat exchanger, and an air-heating start-up refrigerant outlet causing the refrigerant flowing into the refrigerant inlet to bypass the second indoor heat exchanger, and configured to switch between a normal air-heating mode in which the refrigerant flowing into the refrigerant inlet flows into the normal air-heating refrigerant outlet and an air-heating start-up mode in which the refrigerant flowing into the refrigerant inlet flows into the air-heating start-up refrigerant outlet; and an air conditioning control device configured to control the flow path switching device. The air conditioning control device is configured to estimate whether or not the temperature of refrigerant on a high-pressure side in the heat pump device is equal to or lower than a predetermined low temperature, and to switch the flow path switching device to the air-heating start-up mode when the temperature of refrigerant on the high-pressure side in the heat pump device is equal to or lower than the predetermined low temperature, and switch the flow path switching device to the normal air-heating mode when the temperature of refrigerant on the high-pressure side in the heat pump device is higher than the predetermined low temperature.

According to the foregoing configuration, it is estimated that the temperature of refrigerant on the high-pressure side in the heat pump device is equal to or lower than the predetermined low temperature under the circumstances, such as the winter, that an outdoor air temperature is low and that refrigerant on the high-pressure side is cooled to a temperature close to the outdoor air temperature due to the vehicle being left uncontrolled for a long period of time. In this case, the flow path switching device is in the air-heating start-up mode, and refrigerant having circulated in the first indoor heat exchanger flows so as to bypass the second indoor heat exchanger. Thus, since the total volume of the refrigerant path on the high-pressure side in the heat pump device becomes smaller, an increase in pressure and temperature of refrigerant on the high-pressure side in the heat pump device accelerates, and therefore, start-up of air-heating becomes faster.

On the other hand, after the lapse of a predetermined time since air-heating begins, it is estimated that the temperature of refrigerant on the high-pressure side is higher than the predetermined low temperature. In this case, the flow path switching device is in the normal air-heating mode, and refrigerant having circulated in the first indoor heat exchanger flows through the second indoor heat exchanger. Thus, outdoor air can be heated by the first and second indoor heat exchangers, resulting in a high air-heating capacity.

The third aspect of the invention is intended for the vehicle air conditioner of the first or second aspect of the invention, in which the flow path switching device is switchable to an intermediate mode in which the refrigerant flowing into the refrigerant inlet flows into the normal air-heating refrigerant outlet and the air-heating start-up refrigerant outlet, and the air conditioning control device is configured to switch the flow path switching device from the air-heating start-up mode to the intermediate mode before switching of the flow path switching device from the air-heating start-up mode to the normal air-heating mode, and then, switch the flow path switching device from the intermediate mode to the normal air-heating mode.

According to the foregoing configuration, since the operation is temporarily switched to the intermediate mode before the air-heating start-up mode is switched to the normal air-heating mode, part of refrigerant flows through the second indoor heat exchanger, and the remaining refrigerant flows so as to bypass the second indoor heat exchanger. Then, the operation is switched to the normal air-heating mode, and all of refrigerant flows through the second indoor heat exchanger. Thus, a change in refrigerant flow becomes slower, and therefore, lowering of an air-heating capacity due to a rapid change in refrigerant flow can be avoided.

The fourth aspect of the invention is intended for the vehicle air conditioner of the third aspect of the invention, which further includes a first temperature sensor configured to determine the temperature of outdoor air having passed through the first indoor heat exchanger. The air conditioning control device is configured to control an amount of refrigerant circulating in the second indoor heat exchanger such that a change in temperature determined by the first temperature sensor falls within a predetermined range.

According to the foregoing configuration, when the mode of the flow path switching device is switched, the flow rate of refrigerant of each of the first and second indoor heat exchangers can be adjusted such that the temperature of outdoor air having passed through the first indoor heat exchanger does not significantly decrease.

The fifth aspect of the invention is intended for the vehicle air conditioner of the third aspect of the invention, which further includes a first pressure sensor configured to determine the pressure of refrigerant circulating in the first indoor heat exchanger. The air conditioning control device is configured to control an amount of refrigerant circulating in the second indoor heat exchanger such that a change in pressure determined by the first pressure sensor falls within a predetermined range.

According to the foregoing configuration, when the mode of the flow path switching device is switched, the flow rate of refrigerant of each of the first and second indoor heat exchangers can be adjusted such that the pressure of refrigerant circulating in the first indoor heat exchanger is not significantly changed. Thus, a change in temperature becomes slower.

The vehicle air conditioner may further include a discharged air temperature sensor configured to determine the temperature of air-conditioned air supplied into the vehicle compartment. The air conditioning control device may be configured to control the amount of refrigerant circulating in the second indoor heat exchanger such that a change in temperature determined by the discharged air temperature sensor falls within a predetermined range.

According to the foregoing configuration, when the mode of the flow path switching device is switched, the flow rate of refrigerant of each of the first and second indoor heat exchangers can be adjusted such that the temperature of air supplied into the vehicle compartment does not significantly decrease.

The vehicle air conditioner may further include a second temperature sensor configured to determine the temperature of outdoor air having passed through the second indoor heat exchanger. The air conditioning control device may be configured to determine whether or not the temperature determined by the second temperature sensor is equal to or higher than a predetermined temperature, and switch the flow path switching device from the intermediate mode to the normal air-heating mode when it is determined that the temperature determined by the second temperature sensor is equal to or higher than the predetermined temperature.

According to the foregoing configuration, since the mode of the flow path switching device is switched based on the temperature of outdoor air having passed through the second indoor heat exchanger, a decrease in temperature of air-conditioned air supplied into the vehicle compartment can be reduced when the intermediate mode is switched to the normal air-heating mode.

The vehicle air conditioner may further include a second pressure sensor configured to determine the pressure of refrigerant circulating in the second indoor heat exchanger. The air conditioning control device may be configured to determine whether or not the pressure determined by the second pressure sensor is equal to or higher than a predetermined pressure, and switch the flow path switching device from the intermediate mode to the normal air-heating mode when the pressure determined by the second pressure sensor is equal to or higher than the predetermined pressure.

According to the foregoing configuration, since the mode of the flow path switching device is switched based on the pressure of refrigerant circulating in the second indoor heat exchanger, a decrease in temperature of air-conditioned air supplied into the vehicle compartment can be reduced when the intermediate mode is switched to the normal air-heating mode.

The vehicle air conditioner may further include a discharged air temperature sensor configured to determine the temperature of air-conditioned air supplied into the vehicle compartment. The air conditioning control device may be configured to determine whether or not the discharged air temperature determined by the discharged air temperature sensor is equal to or higher than a predetermined temperature, and switch the flow path switching device from the intermediate mode to the normal air-heating mode when the discharged air temperature determined by the discharged air temperature sensor is equal to or higher than the predetermined temperature.

According to the foregoing configuration, since the mode of the flow path switching device is switched based on the pressure of refrigerant circulating in the second indoor heat exchanger, a decrease in temperature of air-conditioned air supplied into the vehicle compartment can be reduced when the intermediate mode is switched to the normal air-heating mode.

In order to accomplish the second objective, the sixth to tenth aspects of the invention are configured as follows.

The sixth aspect of the invention is intended for a vehicle air conditioner including a heat pump device including a compressor configured to compress refrigerant, first and second indoor heat exchangers arranged in a vehicle compartment, and an outdoor heat exchanger disposed outside the vehicle compartment; an indoor air conditioning unit housing the first and second indoor heat exchangers, including an air blower configured to send air-conditioning air to the first and second indoor heat exchangers, and configured to generate air-conditioned air to supply the air-conditioned air into the vehicle compartment; and an air conditioning control device configured to control the heat pump device and the indoor air conditioning unit. The indoor air conditioning unit further includes a supply air volume changer configured to change a volume of air supplied to each of the first and second indoor heat exchangers, and the supply air volume changer is controlled by the air conditioning control device. The air conditioning control device causes the heat pump device to be in an air-heating mode in which the first and second indoor heat exchangers serve as radiators and the outdoor heat exchanger serves as a heat absorber. The air conditioning control device is configured to perform, at beginning of air-heating, an air-heating start-up control for controlling the supply air volume changer such that the volume of air supplied to the first indoor heat exchanger is smaller as compared to that after lapse of a predetermined time since the air-heating begins.

According to the foregoing configuration, since the volume of air supplied to the first indoor heat exchanger is small at start-up of air-heating, the amount of heat exchanged between refrigerant discharged from the compressor and outdoor air while the refrigerant circulates in the first and second indoor heat exchangers can be reduced as compared to the case where much outdoor air is supplied to both of the first and second indoor heat exchangers. Thus, since a decrease in temperature of refrigerant is reduced, an increase in pressure and temperature of refrigerant on the high-pressure side in the heat pump device accelerates, and therefore, start-up of air-heating becomes faster.

Since both of the first and second indoor heat exchangers serve as radiators in the air-heating mode, a high air-heating capacity can be achieved.

The seventh aspect of the invention is intended for a vehicle air conditioner including a heat pump device including a compressor configured to compress refrigerant, first and second indoor heat exchangers arranged in a vehicle compartment, and an outdoor heat exchanger disposed outside the vehicle compartment; an indoor air conditioning unit housing the first and second indoor heat exchangers, including an air blower configured to send air-conditioning air to the first and second indoor heat exchangers, and configured to generate air-conditioned air to supply the air-conditioned air into the vehicle compartment; and an air conditioning control device configured to control the heat pump device and the indoor air conditioning unit. The indoor air conditioning unit further includes a supply air volume changer configured to change a volume of air supplied to each of the first and second indoor heat exchangers, and the supply air volume changer is controlled by the air conditioning control device. The air conditioning control device causes the heat pump device to be in an air-heating mode in which the first and second indoor heat exchangers serve as radiators and the outdoor heat exchanger serves as a heat absorber. The air conditioning control device is configured to estimate whether or not the temperature of refrigerant on a high-pressure side in the heat pump device is equal to or lower than a predetermined low temperature, and perform, when the temperature of refrigerant on the high-pressure side in the heat pump device is equal to or lower than the predetermined low temperature, an air-heating start-up control for controlling the supply air volume changer such that the volume of air supplied to the first indoor heat exchanger is smaller as compared to that when the temperature of refrigerant on the high-pressure side in the heat pump device is higher than the predetermined low temperature.

According to the foregoing configuration, when it is estimated that the temperature of refrigerant on the high-pressure side in the heat pump device is equal to or lower than the predetermined low temperature, the volume of air supplied to the first indoor heat exchanger is small. Thus, the amount of heat exchanged between refrigerant discharged from the compressor and outdoor air while the refrigerant circulates in the first and second indoor heat exchangers can be reduced as compared to the case where much outdoor air is supplied to both of the first and second indoor heat exchangers. Thus, since a decrease in temperature of refrigerant is reduced, an increase in pressure and temperature of refrigerant on the high-pressure side in the heat pump device accelerates, and therefore, start-up of air-heating becomes faster.

Since both of the first and second indoor heat exchangers serve as radiators in the air-heating mode, a high air-heating capacity can be achieved.

The supply air volume changer may be a door for switching the flow direction of air in the indoor air conditioning unit.

According to the foregoing configuration, it is ensured that the volume of supply air is easily switched.

The vehicle air conditioner may further include an outdoor air temperature sensor configured to determine the temperature of air outside the vehicle compartment. The air conditioning control device may be configured to estimate, based on the air temperature determined by the outdoor air temperature sensor, that the temperature of refrigerant on the high-pressure side in the heat pump device is equal to or lower than the predetermined low temperature when the temperature of air outside the vehicle compartment is lower than a predetermined temperature.

That is, the temperature of air outside the vehicle compartment and the temperature of refrigerant on the high-pressure side in the heat pump device relate to each other, and a lower temperature of air outside the vehicle compartment results in a lower temperature of refrigerant on the high-pressure side in the heat pump device. The temperature of air outside the vehicle compartment is determined to estimate the temperature of refrigerant on the high-pressure side in the heat pump device. Thus, the estimation results are accurate.

The vehicle air conditioner may further include a refrigerant temperature sensor configured to determine a refrigerant temperature. The air conditioning control device may be configured to switch, after the air-heating start-up control, the heat pump device and the indoor air conditioning unit to the normal air-heating mode when it is determined that the refrigerant temperature determined by the refrigerant temperature sensor is higher than a predetermined temperature.

According to the foregoing configuration, an actual refrigerant temperature is determined, and the operation is switched to normal air-heating based on the actual refrigerant temperature. Thus, normal air-heating is performed at proper timing after start-up of air-heating.

The vehicle air conditioner may further include a refrigerant pressure sensor configured to determine a refrigerant pressure. The air conditioning control device may be configured to switch, after the air-heating start-up control, the heat pump device and the indoor air conditioning unit to the normal air-heating mode when it is determined that the refrigerant pressure determined by the refrigerant pressure sensor is higher than a predetermined pressure.

According to the foregoing configuration, an actual refrigerant pressure is determined, and the operation is switched to normal air-heating based on the actual refrigerant pressure. Thus, normal air-heating is performed at proper timing after start-up of air-heating.

The eighth aspect of the invention is intended for the vehicle air conditioner of the sixth or seventh aspect of the invention, which further includes an air temperature sensor configured to determine the temperature of air having passed through the indoor heat exchanger. The air conditioning control device is configured to switch, after the air-heating start-up control, the heat pump device and the indoor air conditioning unit to a normal air-heating mode when it is determined that the air temperature determined by the air temperature sensor is higher than a predetermined temperature.

According to the foregoing configuration, the temperature of air having passed through the indoor heat exchanger can be determined to accurately estimate whether or not the refrigerant temperature increases. Moreover, since the operation is switched to normal air-heating based on the temperature of air having passed through the indoor heat exchanger, normal air-heating is performed at proper timing after start-up of air-heating.

The ninth aspect of the invention is intended for the vehicle air conditioner of any one of the sixth to eighth aspects of the invention, in which the air conditioning control device is configured to switch the heat pump device and the indoor air conditioning unit to the normal air-heating mode after lapse of a predetermined time since the air-heating start-up control begins.

According to the foregoing configuration, since the operation is switched to normal air-heating based on the time elapsed after beginning of the air-heating start-up control, a simple control can be achieved, and normal air-heating can be performed at proper timing.

The tenth aspect of the invention is intended for the vehicle air conditioner of the ninth aspect of the invention, in which the air conditioning control device is configured to change, depending on an air temperature outside the vehicle compartment, a time before the heat pump device and the indoor air conditioning unit are switched to the normal air-heating mode and after the air-heating start-up control begins.

For example, in the case where an outdoor air temperature is low as in, e.g., an extremely-cold period, it is assumed that the time required for start-up of air-heating is long. In this case, the time before switching to the normal air-heating mode and after beginning of the air-heating start-up control is increased to perform normal air-heating at proper timing.

The air conditioning control device may be configured to change the time before switching to the normal air-heating control and after beginning of the air-heating start-up control depending on the pressure of refrigerant on the high-pressure side.

That is, if the time required for start-up of air-heating is long, the time before switching to the normal air-heating mode and after beginning of the air-heating start-up control is increased depending on the refrigerant pressure to perform normal air-heating at proper timing.

Advantages of the Invention

According to the first aspect of the invention, since refrigerant flows, at start-up of air-heating, so as to bypass the second indoor heat exchanger, start-up of air-heating can be faster. Moreover, since refrigerant flows through the first and second indoor heat exchangers after the air-heating start-up mode, high air-heating performance can be achieved. Thus, according to the present invention, the degree of passenger's comfort can be improved.

According to the second aspect of the invention, when it is estimated that the temperature of refrigerant on the high-pressure side in the heat pump device is equal to or lower than the predetermined low temperature, refrigerant flows so as to bypass the second indoor heat exchanger. Thus, start-up of air-heating can be faster. Moreover, when it is estimated that the temperature of refrigerant on the high-pressure side in the heat pump device is higher than the predetermined low temperature, refrigerant flows through the first and second indoor heat exchangers. Thus, high air-heating performance can be achieved. Thus, according to the present invention, the degree of passenger's comfort can be improved.

According to the third aspect of the invention, before switching from the air-heating start-up mode to the normal air-heating mode, part of refrigerant can flow through the second indoor heat exchanger while the remaining refrigerant flows so as to bypass the second indoor heat exchanger. Thus, a change in refrigerant flow can be slower, and therefore, a high air-heating capacity can be achieved.

According to the fourth aspect of the invention, the flow rate of refrigerant in the first and second indoor heat exchangers can be adjusted without significantly decreasing the temperature of outdoor air having passed through the first indoor heat exchanger, and therefore, the degree of passenger's comfort can be further improved.

According to the fifth aspect of the invention, the flow rate of refrigerant in the first and second indoor heat exchangers can be adjusted without significantly changing the pressure of refrigerant circulating in the first indoor heat exchanger, and therefore, the degree of passenger's comfort can be further improved.

According to the sixth aspect of the invention, since the volume of air supplied to the first indoor heat exchanger can be reduced at start-up of air-heating, start-up of air-heating can be faster, and therefore, the degree of passenger's comfort can be improved. Moreover, in the air-heating mode, both of the first and second indoor heat exchangers serve as radiators to achieve a high air-heating capacity. Thus, the degree of passenger's comfort can be also improved.

According to the seventh aspect of the invention, when it is estimated that the temperature of refrigerant on the high-pressure side in the heat pump device is equal to or lower than the predetermined low temperature, the volume of air supplied to the first indoor heat exchanger can be reduced. Thus, start-up of air-heating can be faster, and therefore, the degree of passenger's comfort can be improved. Moreover, in the air-heating mode, both of the first and second indoor heat exchangers serve as radiators to achieve a high air-heating capacity. Thus, the degree of passenger's comfort can be also improved.

According to the eighth aspect of the invention, the temperature of air having passed through the indoor heat exchanger is determined, and the air-heating start-up control is switched to the normal air-heating control based on such an air temperature. Thus, normal air-heating can be performed at proper timing, and the degree of passenger's comfort can be further improved.

According to the ninth aspect of the invention, since the operation is switched to the normal air-heating control after the lapse of the predetermined time since the air-heating start-up control begins, a simple control can be achieved, and normal air-heating can be performed at proper timing. The degree of passenger's comfort can be further improved.

According to the tenth aspect of the invention, the time before switching to the normal air-heating control and after beginning of the air-heating start-up control is changed depending on the outdoor air temperature. Thus, normal air-heating can be performed at proper timing depending on an outdoor air temperature, and the degree of passenger's comfort can be further improved.

DESCRIPTION OF EMBODIMENTS

Embodiments of the present invention will be described in detail below with reference to drawings. Note that the embodiments described below will be set forth merely for the purpose of preferred examples in nature, and are not intended to limit the scope, application, and use of the invention.

First Embodiment

Figure 1:
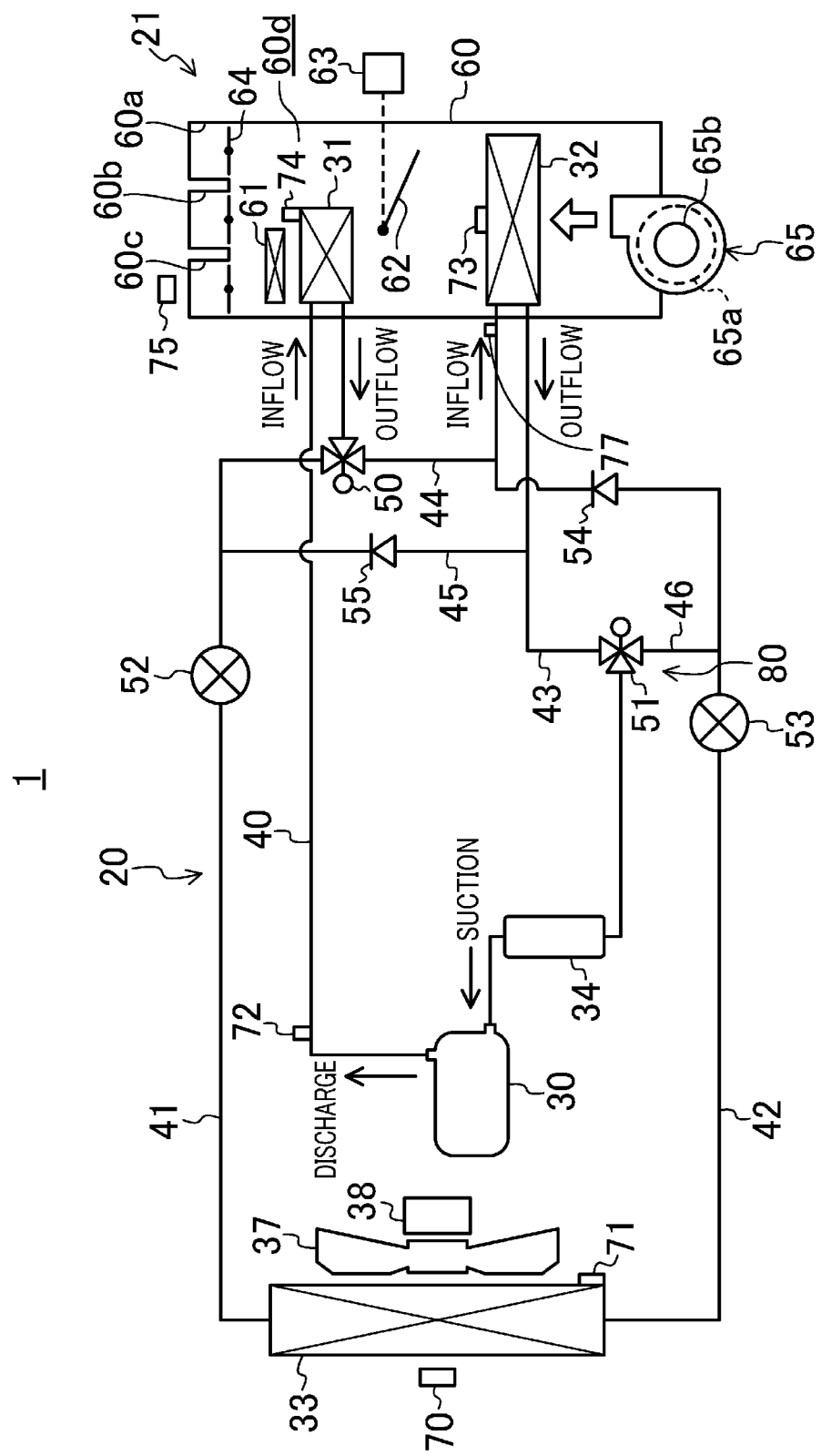
FIG. 1 is a schematic configuration diagram of an vehicle air conditioner of a first embodiment.

FIG. 1 is a schematic configuration diagram of a vehicle air conditioner 1 of a first embodiment of the present invention. A vehicle on which the vehicle air conditioner 1 is mounted is an electric vehicle including a storage battery for running the vehicle and a motor for running the vehicle.

The vehicle air conditioner 1 includes a heat pump device 20, an indoor air conditioning unit 21, and an air conditioning control device 22 (illustrated in FIG. 2) configured to control the heat pump device 20 and the indoor air conditioning unit 21.

The heat pump device 20 includes an electric compressor 30 configured to compress refrigerant, a downstream indoor heat exchanger (first indoor heat exchanger) 31 disposed inside a vehicle compartment, an upstream indoor heat exchanger (second indoor heat exchanger) 32 disposed upstream of the downstream indoor heat exchanger 31 in the flow direction of air in the vehicle compartment, an outdoor heat exchanger 33 disposed outside the vehicle compartment, an accumulator 34, first to fourth main refrigerant pipes 40-43 connecting the components 30-34 together, and first and third branched refrigerant pipes 44-46.

The electric compressor 30 is a conventional well-known electric compressor to be mounted on a vehicle, and is driven by an electric motor. The discharge amount of the electric compressor 30 per unit time can be changed in such a manner that the rotational speed of the electric compressor 30 is changed. The electric compressor 30 is connected to the air conditioning control device 22 such that ON/OFF of the electric compressor 30 and the rotational speed of the electric compressor 30 are controlled. Power is supplied from the storage battery to the electric compressor 30.

Figure 3:
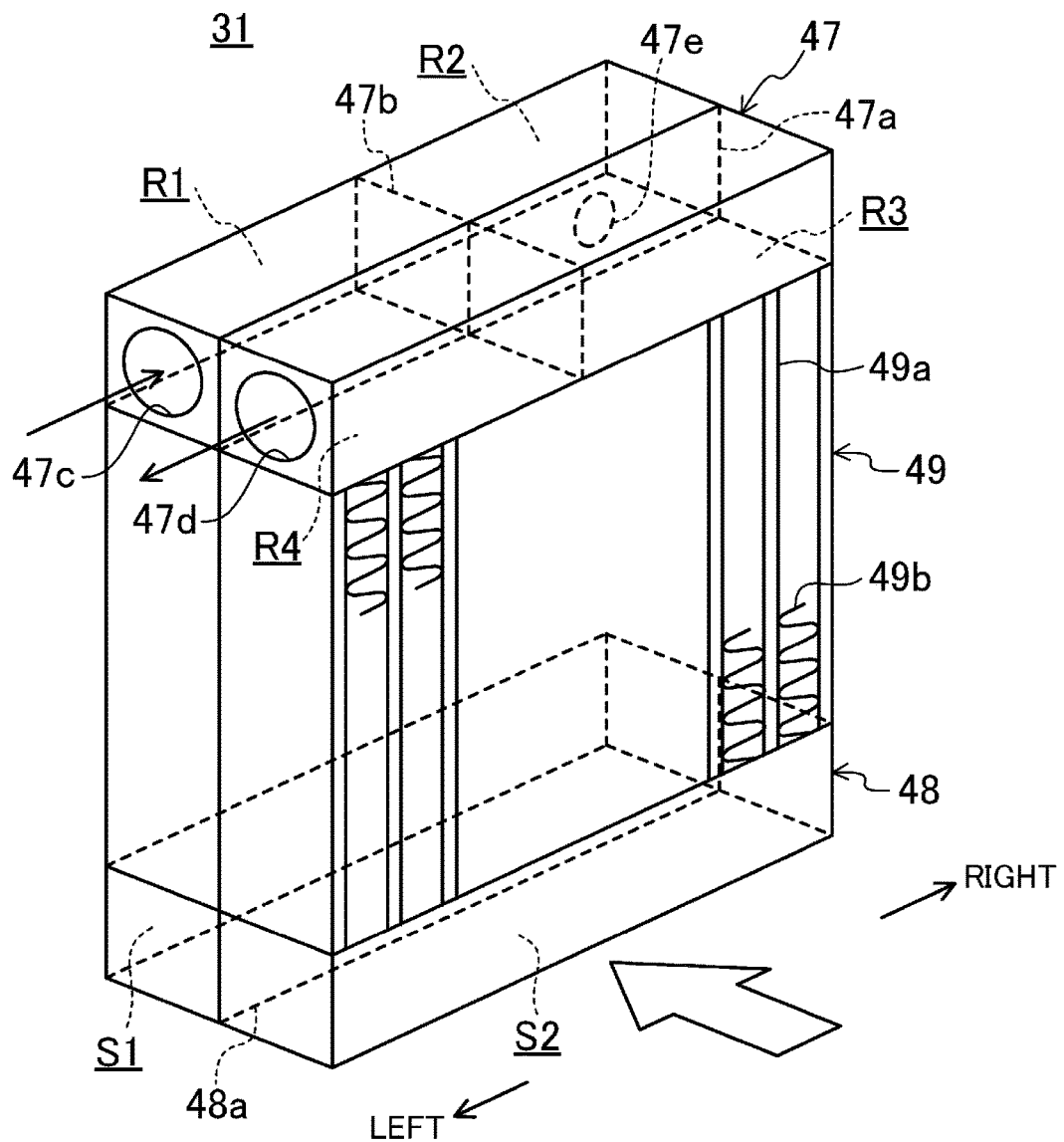
FIG. 3 is a perspective view of a downstream indoor heat exchanger from an upstream side in the flow direction of air.

Referring to FIG. 3, the downstream indoor heat exchanger 31 includes an upper header tank 47, a lower header tank 48, and a core 49. In the core 49, tubes 49a extending in the vertical direction and fins 49b extending in the vertical direction are integrated together so as to be alternately arranged in the horizontal direction (i.e., the right-left direction as viewed in FIG. 3). Air-conditioning air passes between each adjacent ones of the tubes 49a. The flow direction of air-conditioning air is indicated by a white arrow. The tubes 49a are arranged in two lines in the flow direction of air.

Upstream ones of the tubes 49a in the flow direction of air and downstream ones of the tubes 49a in the flow direction of air are, at upper ends thereof, connected to the upper header tank 47 so as to communicate with the upper header tank 47. A first divider 47a is provided, which is configured to divide an internal space of the upper header tank 47 into upstream and downstream spaces in the flow direction of air. The space of the upper header tank 47 upstream of the first divider 47a in the flow direction of air communicates with the upper ends of the upstream ones of the tubes 49a, and the space of the upper header tank 47 downstream of the first divider 47a in the flow direction of air communicates with the upper ends of the downstream ones of the tubes 49a.

A second divider 47b is provided, which is configured to divide the internal space of the upper header tank 47 into right and left spaces. A communication hole 47e is formed at part of the first divider 47a on the right side of the second divider 47b.

A refrigerant inlet 47c is formed at part of a left side surface of the upper header tank 47 on the downstream side in the flow direction of air, and a refrigerant outlet 47d is formed at part of the left side surface of the upper header tank 47 on the upstream side in the flow direction of air.

As in the first divider 47a of the upper header tank 47, a divider 48a is provided, which is configured to divide an internal space of the lower header tank 48 into upstream and downstream spaces in the flow direction of air. The space of the lower header tank 48 upstream of the divider 48a in the flow direction of air communicates with lower ends of the upstream ones of the tubes 49a, and the space of the lower header tank 48 downstream of the divider 48a in the flow direction of air communicates with lower ends of the downstream ones of the tubes 49a.

According to the foregoing configuration, the downstream indoor heat exchanger 31 has the total of four paths. That is, refrigerant flowing into the downstream indoor heat exchanger 31 through the refrigerant inlet 47c first flows into a space R1 formed on the downstream side of the first divider 47a of the upper header tank 47 in the flow direction of air and formed on the left side of the second divider 47b, and then flows downward in ones of the tubes 49a communicating with the space R1.

Subsequently, the refrigerant flows into a space S1 formed on the downstream side of the divider 48a of the lower header tank 48 in the flow direction of air to flow toward the right side, and then flows upward in ones of the tubes 49a. Then, the refrigerant flows into a space R2 formed on the downstream side of the first divider 47a of the upper header tank 47 in the flow direction of air and formed on the right side of the second divider 47b.

Next, the refrigerant in the space R2 passes through the communication hole 47e of the first divider 47a, and flows into a space R3 formed on the upstream side of the first divider 47a of the upper header tank 47 in the flow direction of air and formed on the right side of the second divider 47b. Then, the refrigerant flows downward in ones of the tubes 49a communicating with the space R3.

Subsequently, the refrigerant flows into a space S2 formed on the upstream side of the divider 48a of the lower header tank 48 in the flow direction of air to flow toward the left side, and then flows upward in ones of the tubes 49a. Then, the refrigerant flows into a space R4 formed on the upstream side of the first divider 47a of the upper header tank 47 in the flow direction of air and formed on the left side of the second divider 47b, and is discharged to the outside through the refrigerant outlet 47d.

The upstream indoor heat exchanger 32 is merely larger than the downstream indoor heat exchanger 31, and has a structure similar to that of the downstream indoor heat exchanger 31. Thus, the detailed description of the upstream indoor heat exchanger 32 will not be repeated.

Figure 4:
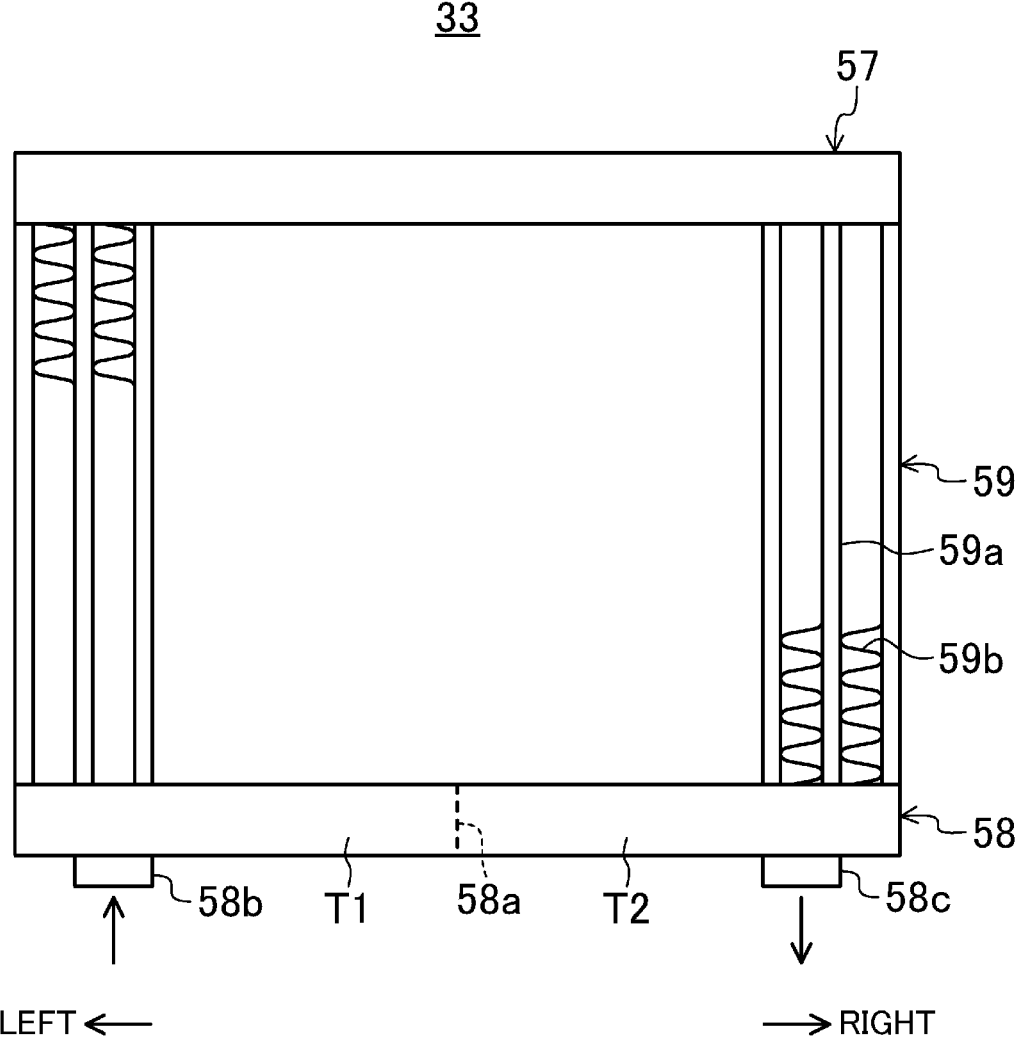
FIG. 4 is a front view of an outdoor heat exchanger.

The outdoor heat exchanger 33 is disposed near a front end in a motor room (equivalent to an engine room in an engine-driven vehicle) formed in a front part of the vehicle, and is exposed to traveling air. Referring to FIG. 4, the outdoor heat exchanger 33 includes an upper header tank 57, a lower header tank 58, and a core 59. In the core 59, tubes 59a extending in the vertical direction and fins 59b extending in the vertical direction are integrated together so as to be alternately arranged in the horizontal direction. Air-conditioning air passes between each adjacent ones of the tubes 59a.

The tubes 59a are, at upper ends thereof, connected to the upper header tank 57 so as to communicate with the upper header tank 57. The tubes 59a are, at lower ends thereof, connected to the lower header tank 58 so as to communicate with the lower header tank 58.

A divider 58a is provided, which is configured to divide an internal space of the lower header tank 58 into right and left spaces. An inlet pipe 58b through which refrigerant flows into the lower header tank 58 is provided on the left side at the lower header tank 58, and an outlet pipe 58c through which refrigerant flows out from the lower header tank 58 is provided on the right side at the lower header tank 58.

Thus, in the outdoor heat exchanger 33, refrigerant flowing into the outdoor heat exchanger 33 through the inlet pipe 58b flows into a space T1 formed on the left side of the divider 58a of the lower header tank 58, and then flows upward through ones of the tubes 59a communicating with the space T1. Subsequently, the refrigerant flows into the upper header tank 57 to flow toward the right side, and then flows downward in ones of the tubes 59a. Then, the refrigerant flows into a space T2 formed on the right side of the divider 58a of the lower header tank 58, and then flows out to the outside through the outlet pipe 58c.

Referring to FIG. 1, a cooling fan 37 is provided at the vehicle. The cooling fan 37 is driven by a fan motor 38, and is configured to send air to the outdoor heat exchanger 33. The fan motor 38 is connected to the air conditioning control device 22 such that ON/OFF of the fan motor 38 and the rotational speed of the fan motor 38 are controlled. Power is also supplied from the storage battery to the fan motor 38.

Note that the cooling fan 37 is capable of sending air to a radiator for cooling, e.g., an inverter for running the vehicle, and is operable under situations other than the situation where air conditioning is required.

The first main refrigerant pipe 40 connects between a discharge port of the electric compressor 30 and the refrigerant inlet of the downstream indoor heat exchanger 31. Moreover, the second main refrigerant pipe 41 connects between the refrigerant outlet of the downstream indoor heat exchanger 31 and the refrigerant inlet of the outdoor heat exchanger 33. The third main refrigerant pipe 42 connects between the refrigerant outlet of the outdoor heat exchanger 33 and the refrigerant inlet of the upstream indoor heat exchanger 32. The fourth main refrigerant pipe 43 connects between the refrigerant outlet of the upstream indoor heat exchanger 32 and a suction port of the electric compressor 30.

The first branched refrigerant pipe 44 is branched from the second main refrigerant pipe 41, and is connected to the third main refrigerant pipe 42. The second branched refrigerant pipe 45 is branched from the second main refrigerant pipe 41, and is connected to the fourth main refrigerant pipe 43. The third branched refrigerant pipe 46 is branched from the third main refrigerant pipe 42, and is connected to the fourth main refrigerant pipe 43.

The accumulator 34 is disposed close to the suction port of the electric compressor 30 in the middle of the fourth main refrigerant pipe 43.

The heat pump device 20 further includes a high-pressure flow path switching device 50, a low-pressure flow path switching device 51, a first expansion valve 52, a second expansion valve 53, a first check valve 54, and a second check valve 55.

The high-pressure flow path switching device 50 forms the flow path switching device of the present invention, and is an electric three-way valve controlled by the air conditioning control device 22. The high-pressure flow path switching device 50 is disposed at the position in the middle of the second main refrigerant pipe 41, and is connected to the first branched refrigerant pipe 44.

Although not shown, a switching valve is built in the high-pressure flow path switching device 50. The switching valve can operate to change the flow direction of refrigerant and the amount of refrigerant flowing into each pipe.

The low-pressure flow path switching device 51 is an electric three-way valve similar to the high-pressure flow path switching device 50, and is controlled by the air conditioning control device 22. The low-pressure flow path switching device 51 is provided in the middle of the fourth main refrigerant pipe 43, and is connected to the third branched refrigerant pipe 46.

The first expansion valve 52 and the second expansion valve 53 are electric valves, and are switchable between an expansion state in which a flow path is narrowed to expand refrigerant and a non-expansion state in which the flow path is opened so as not to expand refrigerant. The first expansion valve 52 and the second expansion valve 53 are controlled by the air conditioning control device 22. In the expansion state, the degree of opening of each of the first expansion valve 52 and the second expansion valve 53 is set depending on an air-conditioning load state.

The first expansion valve 52 is disposed at part of the second main refrigerant pipe 41 closer to the outdoor heat exchanger 33 relative to the high-pressure flow path switching device 50. The second expansion valve 53 is disposed at part of the third main refrigerant pipe 42 closer to the outdoor heat exchanger 33 relative to the third branched refrigerant pipe 46.

The first check valve 54 is disposed at the third main refrigerant pipe 42, and is configured to allow refrigerant to flow from the outdoor heat exchanger 33 toward the upstream indoor heat exchanger 32 in the third main refrigerant pipe 42 and to prevent refrigerant from flowing in an opposite direction.

The second check valve 55 is disposed at the second branched refrigerant pipe 45, and is configured to allow refrigerant to flow from the main refrigerant pipe 43 toward the second main refrigerant pipe 41 in the second branched refrigerant pipe 45 and to prevent refrigerant from flowing in an opposite direction.

The indoor air conditioning unit 21 includes a casing 60 housing the downstream indoor heat exchanger 31 and the upstream indoor heat exchanger 32, an air heater 61 housed in the casing 60, an air mix door (temperature adjustment door) 62 configured to switch the flow direction of air in the casing 60 (indoor air conditioning unit 21), an air mix door actuator 63 configured to drive the air mix door 62, a discharge-mode switching door 64, and an air blower 65. The air mix door 62 serves as a supply air volume changer.

The air blower 65 is configured to select one of air (indoor air) inside the vehicle compartment or air (outdoor air) outside the vehicle compartment to send the selected air into the casing 60 as air-conditioning air. The air blower 65 includes a sirocco fan 65a and a blower motor 65b configured to rotatably drive the sirocco fan 65a. The blower motor 65b is connected to the air conditioning control device 22 such that ON/OFF of the blower motor 65b and the rotational speed of the blower motor 65*b* are controlled. Power is also supplied from the storage battery to the blower motor 65*b*.

The casing 60 is disposed inside an instrument panel (not shown) in the vehicle compartment. A defroster discharge port 60*a*, a vent discharge port 60*b*, and a heat discharge port 60*c* are formed at the casing 60. These discharge ports 60*a*-60*c* are each opened/closed by the discharge-mode switching door 64. Although not shown, the discharge-mode switching door 64 is operated by an actuator connected to the air conditioning control device 22. Examples of a discharge mode include a defroster mode for sending air-conditioning air to the defroster discharge port 60*a*, a vent mode for sending air-conditioning air to the vent discharge port 60*b*, a heat mode for sending air-conditioning air to the heat discharge port 60*c*, a defroster/heat mode for sending air-conditioning air to the defroster discharge port 60*a* and the heat discharge port 60*c*, and a bi-level mode for sending air-conditioning air to the vent discharge port 60*b* and the heat discharge port 60*c*.

The total volume of air-conditioning air introduced into the casing 60 passes through the upstream indoor heat exchanger 32.

A bypass path 60*d* is formed in the casing 60. The bypass path 60*d* is configured to prevent air having passed through the upstream indoor heat exchanger 32 from flowing toward the downstream indoor heat exchanger 31 and to allow such air to bypass the downstream indoor heat exchanger 31 to flow toward the downstream side.

In the casing 60, the air mix door 62 is housed between the upstream indoor heat exchanger 32 and the downstream indoor heat exchanger 31. The air mix door 62 is configured to adjust the temperature of discharged air in such a manner that the amount of air which has passed through the upstream indoor heat exchanger 32 and which is about to pass through the downstream indoor heat exchanger 31 is changed to determine a mixing ratio between air having passed through the upstream indoor heat exchanger 32 and air having passed through the downstream indoor heat exchanger 31.

The degree of opening of the air mix door 62 is switchable to an optional opening degree between the opening degree at which the flow of air toward the downstream indoor heat exchanger 31 is blocked (i.e., the opening degree at which the bypass path 60*d* fully opens) and the opening degree at which all of air having passed through the upstream indoor heat exchanger 32 flows into the downstream indoor heat exchanger 31 (i.e., the opening degree at which the bypass path 60*d* is fully closed).

Air having passed through the downstream indoor heat exchanger 31 and air having circulated through the bypass path 60*d* are mixed together in the region of the casing 60 downstream of the air mix door 62, thereby forming air-conditioned air having a desired temperature.

The air heater 61 is housed downstream of the downstream indoor heat exchanger 31 in the casing 60. The air heater 61 may be, e.g., a PTC heater using a PTC element generating heat by current application. The air heater 61 is connected to the air conditioning control device 22 such that ON/OFF of the air heater 61 and the amount of heat generation of the air heater 61 (the power supply amount of the air heater 61) are controlled. Power is also supplied from the storage battery to the air heater 61.

The vehicle air conditioner 1 further includes an outdoor air temperature sensor 70, an outdoor heat exchanger temperature sensor 71, a high-pressure refrigerant pressure sensor 72, an upstream indoor heat exchanger temperature sensor 73, a downstream indoor heat exchanger temperature sensor 74, a discharged air temperature sensor 75, and an upstream indoor heat exchanger pressure sensor (refrigerant pressure/temperature sensor) 77. These sensors 70-75 and 77 are connected to the air conditioning control device 22.

The outdoor air temperature sensor 70 is disposed upstream of the outdoor heat exchanger 33 in the flow direction of air, and is configured to determine the temperature (outdoor air temperature TG) of outdoor air before the outdoor air flows into the outdoor heat exchanger 33. The outdoor heat exchanger temperature sensor 71 is disposed on a downstream surface of the outdoor heat exchanger 33 in the flow direction of air, and is configured to determine the surface temperature of the outdoor heat exchanger 33.

The high-pressure refrigerant pressure sensor 72 is disposed closer to the discharge port of the electric compressor 30 at the first main refrigerant pipe 40, and is configured to determine the high-side refrigerant pressure of the heat pump device 20, i.e., the pressure of refrigerant circulating through the downstream indoor heat exchanger 31.

The upstream indoor heat exchanger temperature sensor 73 is disposed downstream of the upstream indoor heat exchanger 32 in the flow direction of air, and is configured to determine the surface temperature of the upstream indoor heat exchanger 32 to determine the temperature of outdoor air having passed through the upstream indoor heat exchanger 32.

The downstream indoor heat exchanger temperature sensor 74 is disposed downstream of the downstream indoor heat exchanger 31 in the flow direction of air, and is configured to determine the surface temperature of the downstream indoor heat exchanger 31 to determine the temperature of outdoor air having passed through the downstream indoor heat exchanger 31.

The discharged air temperature sensor 75 is configured to determine the temperature of air discharged from the casing 60, i.e., the temperature of air-conditioned air discharged into the vehicle compartment, and is disposed at a predetermined part of the vehicle compartment.

The upstream indoor heat exchanger pressure sensor 77 is configured to individually determine the pressure and temperature of refrigerant circulating through the upstream indoor heat exchanger 32.

An in-compartment temperature sensor 76 configured to determine the temperature (TR) in the vehicle compartment is provided at the vehicle air conditioner 1, and is also connected to the air conditioning control device 22.

The air conditioning control device 22 is configured to set the operation mode of the heat pump device 20 based on, e.g., a temperature set by a passenger, an outdoor air temperature, a temperature inside the vehicle compartment, and the amount of solar radiation. Moreover, the air conditioning control device 22 is also configured to set not only the volume of air from the air blower 65 (the rotational speed of the blower motor 65*b*) and the degree of opening of the air mix door 62 but also the mode of the high-pressure flow path switching device 50.

The air conditioning control device 22 controls the heat pump device 20 to the set operation mode, and controls the air blower 65 and the air mix door actuator 63 respectively to the set air volume and the set opening degree. The air conditioning control device 22 is, e.g., a well-known central processing unit, ROM, or RAM.

Moreover, the air conditioning control device 22 is further configured to control the electric compressor 30 and the fan motor 38 depending on an air-conditioning load, and is also configured to control the air heater 61, if necessary.

As in a typical automatic air-conditioning control, the air conditioning control device 22 controls, in a later-described main routine, switching of the operation mode of the heat pump device 20, the volume of air from the air blower 65, the degree of opening of the air mix door 62, switching of the discharge mode, the electric compressor 30, and the blower motor 65b. For example, although the fan motor 38 basically operates during operation of the electric compressor 30, the fan motor 38 is operable even in a resting state of the electric compressor 30 when, e.g., cooling of the inverter is required.

The operation mode of the heat pump device 20 includes four types of operation modes: an air-heating start-up operation mode; a normal air-heating operation mode; an air-cooling operation mode; and a defrosting operation mode.

Figure 5:
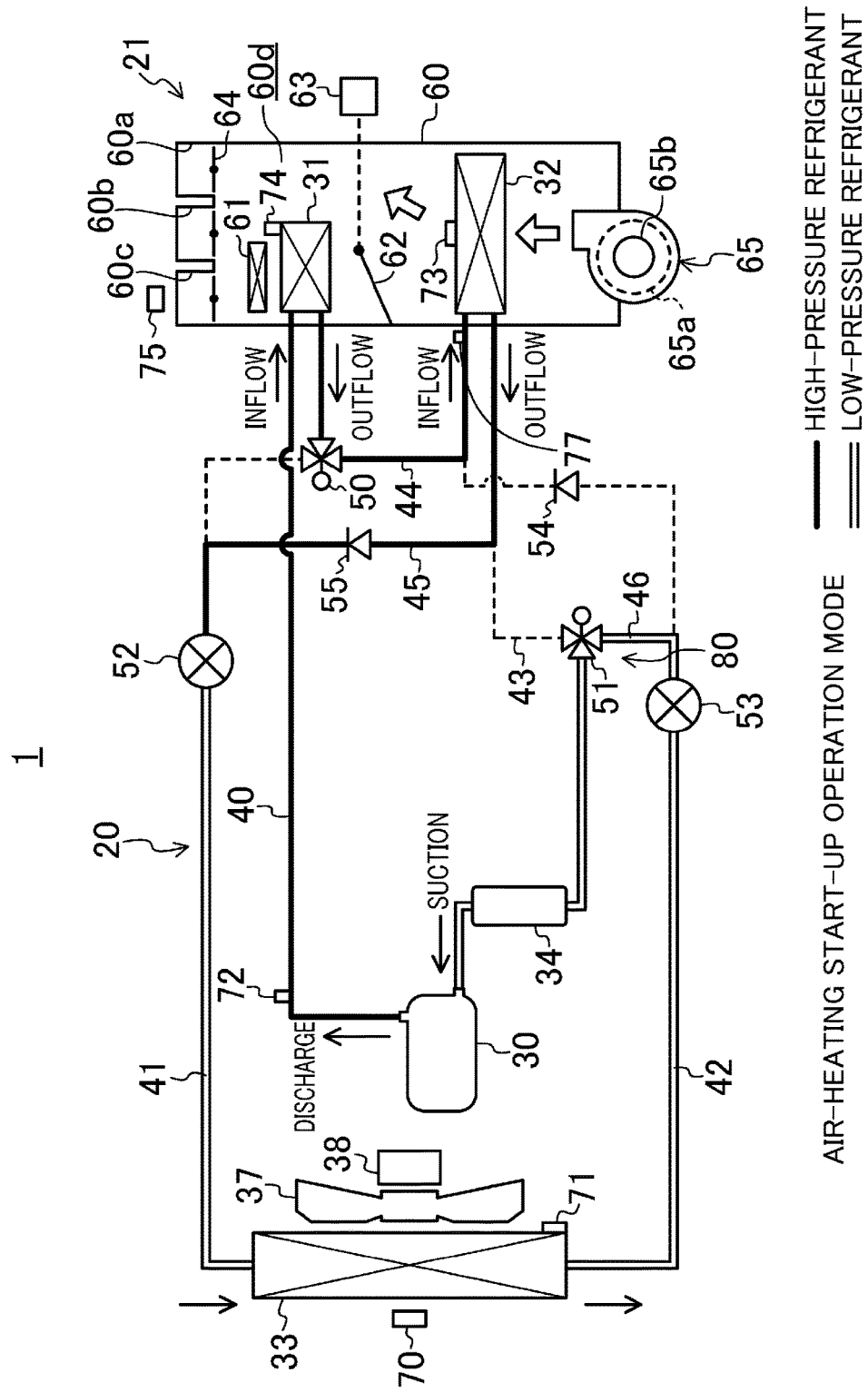
FIG. 5 is a diagram illustrating the case of an air-heating start-up operation mode and corresponding to FIG. 1.

The air-heating start-up operation mode illustrated in FIG. 5 is selected under the circumstances that the outdoor air temperature is, e.g., lower than 0° C. (under extremely-low outdoor air temperature) and that it is estimated that the temperature of refrigerant on a high-pressure side in the heat pump device 20 decreases to a temperature of equal to or lower than about the outdoor air temperature (predetermined low temperature) due to, e.g., the vehicle being left uncontrolled for a long period of time. In the air-heating start-up operation mode, the downstream indoor heat exchanger 31 and the upstream indoor heat exchanger 32 serve as radiators, and the outdoor heat exchanger 33 serves as a heat absorber. In the figure, a dashed line indicates the refrigerant pipe through which no refrigerant flows.

In the air-heating start-up operation mode, the high-pressure flow path switching device 50 switches the flow path to cause refrigerant flowing out from the downstream indoor heat exchanger 31 to flow into the upstream indoor heat exchanger 32. Moreover, the low-pressure flow path switching device 51 switches the flow path to cause refrigerant flowing out from the outdoor heat exchanger 33 to flow into the accumulator 34. The first expansion valve 52 is in the expansion state, and the second expansion valve 53 is in the non-expansion state.

Moreover, in the air-heating start-up operation mode, the degree of opening of the air mix door 62 of the indoor air conditioning unit 21 is controlled such that the bypass path 60d fully opens. This is called an "air-heating start-up control." Thus, in the air-heating start-up operation mode, no air having passed through the upstream indoor heat exchanger 32 passes through the downstream indoor heat exchanger 31.

Due to, e.g., poor sealability at a peripheral edge part of the air mix door 62, a certain volume of air may pass through the downstream indoor heat exchanger 31. However, such a state also indicates the state in which the degree of opening of the air mix door 62 is such an opening degree that the bypass path 60d fully opens.

When the electric compressor 30 operates in the foregoing state, high-pressure refrigerant discharged from the electric compressor 30 flows into the downstream indoor heat exchanger 31 through the first main refrigerant pipe 40, and circulates in the downstream indoor heat exchanger 31. The refrigerant having circulated in the downstream indoor heat exchanger 31 flows from the second main refrigerant pipe 41 to the high-pressure flow path switching device 50. The refrigerant flowing into the high-pressure flow path switching device 50 flows into the upstream indoor heat exchanger 32 through the first branched refrigerant pipe 44, and circulates in the upstream indoor heat exchanger 32.

The refrigerant having circulated in the upstream indoor heat exchanger 32 flows from the fourth main refrigerant pipe 43 to the second main refrigerant pipe 41 through the second branched refrigerant pipe 45. The refrigerant flowing into the second main refrigerant pipe 41 is expanded by passing through the first expansion valve 52, and then flows into the outdoor heat exchanger 33. The refrigerant flowing into the outdoor heat exchanger 33 absorbs heat from outdoor air. Then, the refrigerant passes through the third main refrigerant pipe 42 and the third branched refrigerant pipe 46 in this order, and is sucked into the electric compressor 30 through the accumulator 34.

In the air-heating start-up operation mode, refrigerant discharged from the electric compressor 30 circulates in the downstream indoor heat exchanger 31. However, since the degree of opening of the air mix door 62 is set such that no air-conditioning air flows through the downstream indoor heat exchanger 31, little heat is exchanged between the refrigerant circulating in the downstream indoor heat exchanger 31 and outdoor air. Thus, an increase in temperature and pressure of refrigerant on the high-pressure side in the heat pump device 20 accelerates.

Figure 6:
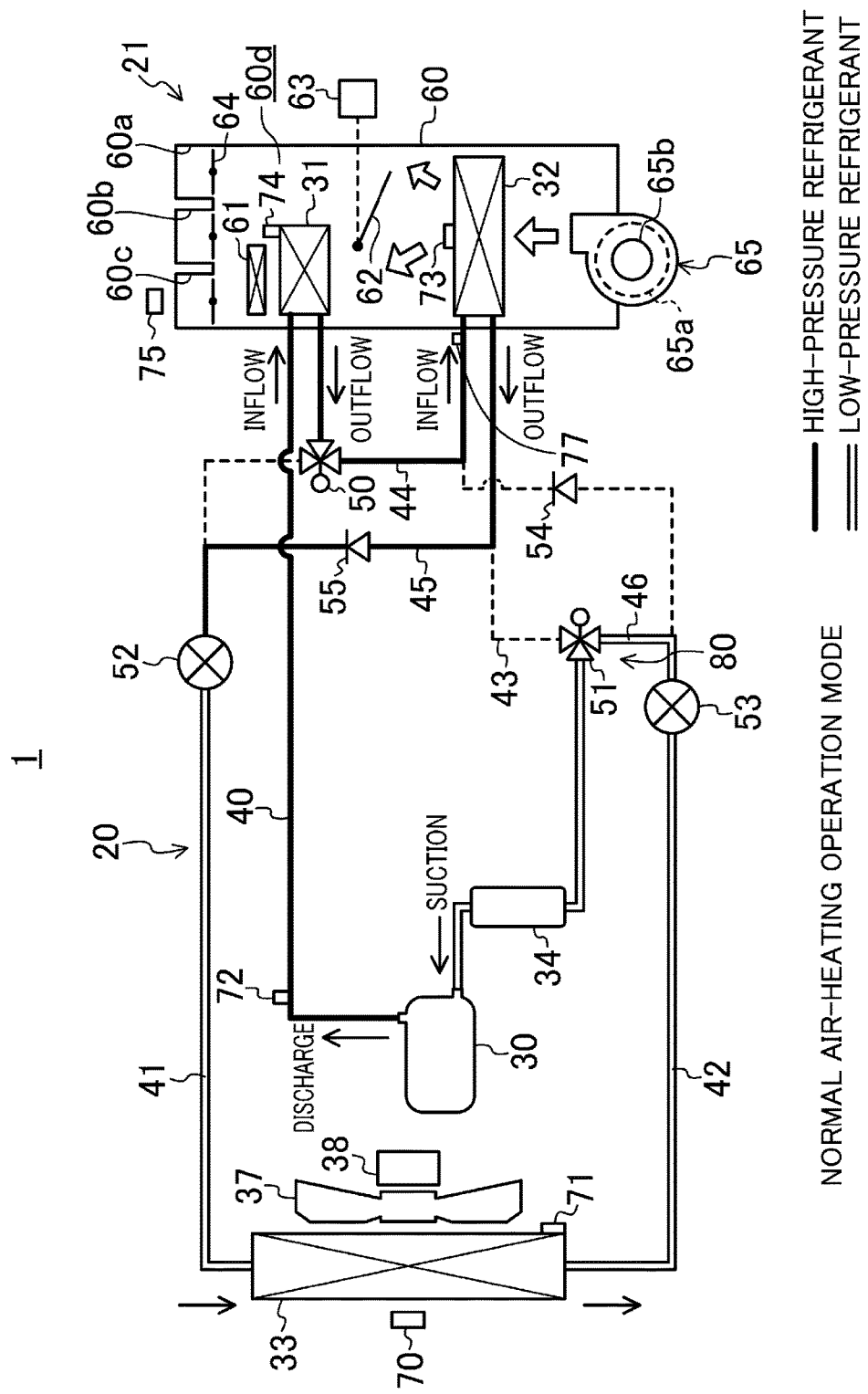
FIG. 6 is a diagram illustrating the case of an air-heating operation mode and corresponding to FIG. 1.

The normal air-heating operation mode illustrated in FIG. 6 is selected under the circumstances that the outdoor air temperature is, e.g., lower than 0° C. (under extremely-low outdoor air temperature) and that it is assumed that the air-heating start-up operation mode is not required as in the case where the temperature of refrigerant on the high-pressure side in the heat pump device 20 is higher than the outdoor air temperature.

In the normal air-heating operation mode, the downstream indoor heat exchanger 31 and the upstream indoor heat exchanger 32 serve as radiators, and the outdoor heat exchanger 33 serves as a heat absorber.

Moreover, in the normal air-heating operation mode, the degree of opening of the air mix door 62 of the indoor air conditioning unit 21 is controlled at the opening degree obtained based on, e.g., a temperature set by a passenger. This is called a "normal air-heating control." Thus, in the normal air-heating operation mode, air having passed through the upstream indoor heat exchanger 32 passes through the downstream indoor heat exchanger 31. Thus, the volume of air passing through the downstream indoor heat exchanger 31 is greater than that in the air-heating start-up operation mode.

That is, the high-pressure flow path switching device 50 and the low-pressure flow path switching device 51 operate as in the foregoing air-heating operation mode. The first expansion valve 52 is in the expansion state, and the second expansion valve 53 is in the non-expansion state.

When the electric compressor 30 operates in the foregoing state, high-pressure refrigerant discharged from the electric compressor 30 flows as in the foregoing air-heating operation mode, i.e., high-temperature refrigerant flows into the downstream indoor heat exchanger 31 and the upstream indoor heat exchanger 32. Air-conditioning air is heated by both of the downstream indoor heat exchanger 31 and the upstream indoor heat exchanger 32, resulting in a high air-heating capacity.

Figure 7:
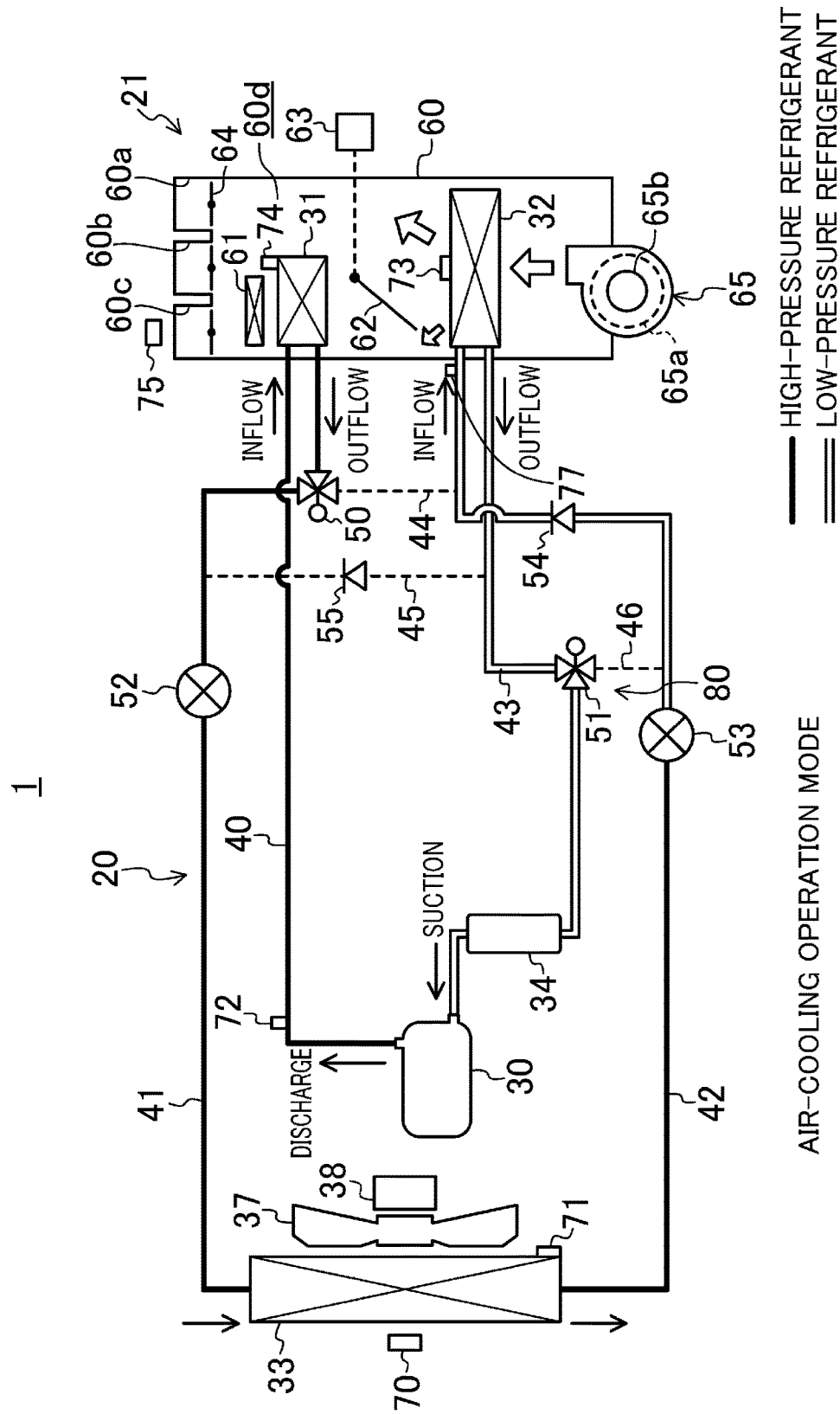
FIG. 7 is a diagram illustrating the case of an air-cooling operation mode and corresponding to FIG. 1.

The air-cooling operation mode illustrated in FIG. 7 is selected when the outdoor air temperature is, e.g., higher than 25° C. In the air-cooling operation mode, the downstream indoor heat exchanger 31 serves as a radiator, the upstream indoor heat exchanger 32 serves as a heat absorber, and the outdoor heat exchanger 33 serves as a radiator.

That is, the high-pressure flow path switching device 50 switches the flow path such that refrigerant flowing out from the downstream indoor heat exchanger 31 flows toward the first expansion valve 52 so as not to flow into an inlet port of the upstream indoor heat exchanger 32. Moreover, the low-pressure flow path switching device 51 switches the flow path to cause refrigerant flowing out from the upstream indoor heat exchanger 32 to flow into the accumulator 34. The first expansion valve 52 is in the non-expansion state, and the second expansion valve 53 is in the expansion state.

Moreover, in the air-cooling operation mode, the degree of opening of the air mix door 62 of the indoor air conditioning unit 21 is controlled at the opening degree obtained based on, e.g., a temperature set by a passenger.

When the electric compressor 30 operates in the foregoing state, high-pressure refrigerant discharged from the electric compressor 30 flows into the downstream indoor heat exchanger 31 through the first main refrigerant pipe 40, and circulates in the downstream indoor heat exchanger 31. The refrigerant having circulated in the downstream indoor heat exchanger 31 flows, without being expanded, into the outdoor heat exchanger 33 through the main refrigerant pipe 41. The refrigerant flowing into the outdoor heat exchanger 33 dissipates heat, and is expanded by passing through the second expansion valve 53 of the third main refrigerant pipe 42. Then, the refrigerant flows into the upstream indoor heat exchanger 32. The refrigerant flowing into the upstream indoor heat exchanger 32 circulates in the upstream indoor heat exchanger 32 to absorb heat from air-conditioning air. The refrigerant having circulated in the upstream indoor heat exchanger 32 is sucked into the electric compressor 30 through the accumulator 34 of the fourth main refrigerant pipe 43.

Depending on the degree of opening of the air mix door 62, the volume of air passing through the downstream indoor heat exchanger 31 and the volume of air passing through the upstream indoor heat exchanger 32 are changed. As a result, air-conditioned air having a desired temperature is generated.

Figure 8:
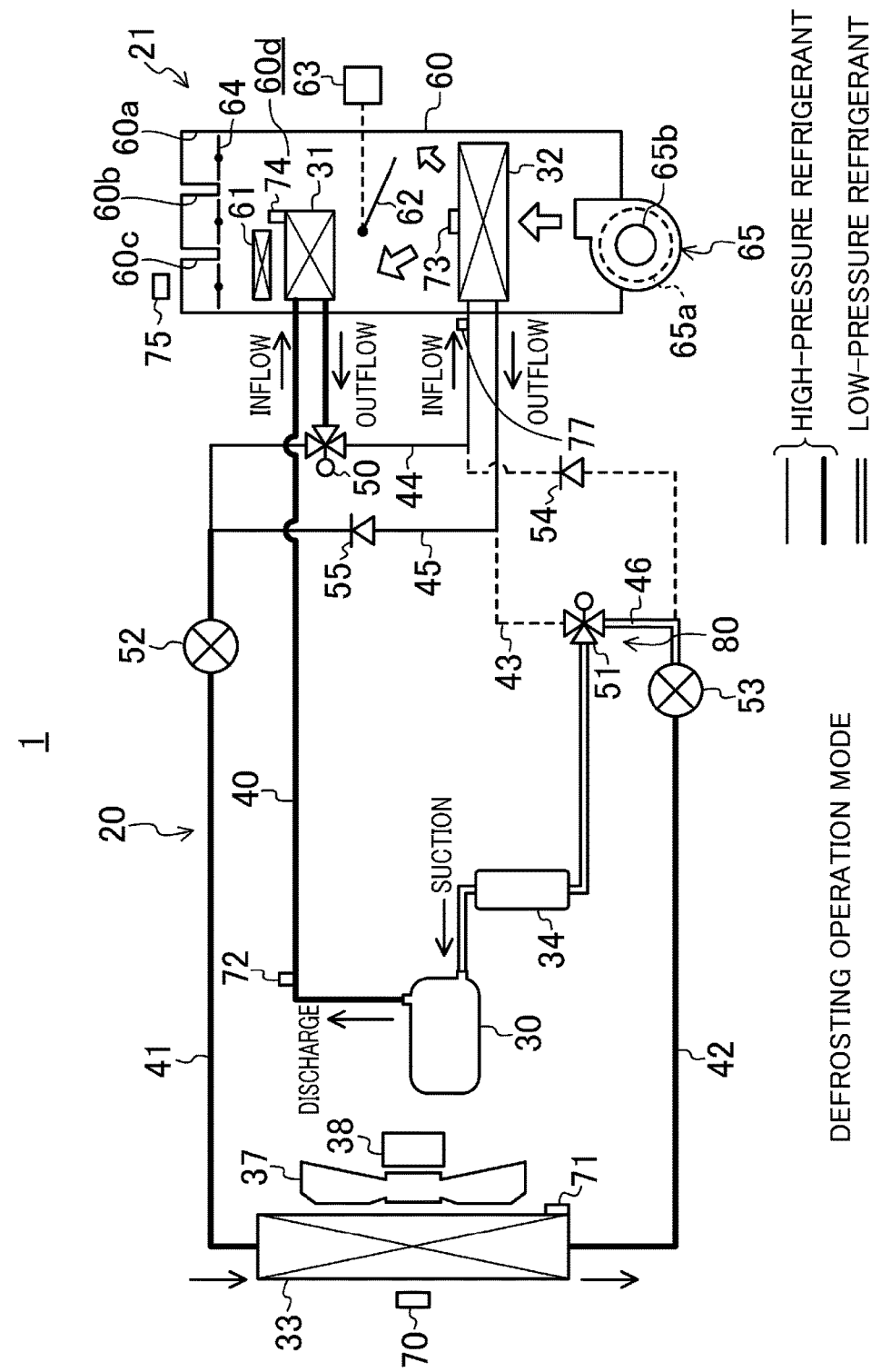
FIG. 8 is a diagram illustrating the case of a defrosting operation mode and corresponding to FIG. 1.

The defrosting operation mode illustrated in FIG. 8 is selected when frost is formed on the outdoor heat exchanger 33. In the defrosting operation mode, the downstream indoor heat exchanger 31, the upstream indoor heat exchanger 32, and the outdoor heat exchanger 33 serve as radiators.

That is, the high-pressure flow path switching device 50 switches the flow path to cause refrigerant having circulated in the downstream indoor heat exchanger 31 to flow into the upstream indoor heat exchanger 32 and the outdoor heat exchanger 33. Moreover, the low-pressure flow path switching device 51 switches the flow path to cause refrigerant flowing out from the outdoor heat exchanger 33 to flow into the accumulator 34. The first expansion valve 52 is in the expansion state, and the second expansion valve 53 is in the non-expansion state.

When the electric compressor 30 operates in the foregoing state, high-pressure refrigerant discharged from the electric compressor 30 flows into the downstream indoor heat exchanger 31 through the first main refrigerant pipe 40, and circulates in the downstream indoor heat exchanger 31. The refrigerant having circulated in the downstream indoor heat exchanger 31 flows into the high-pressure flow path switching device 50 through the second main refrigerant pipe 41. Part of the refrigerant flowing out from the high-pressure flow path switching device 50 flows into the upstream indoor heat exchanger 32 through the first branched refrigerant pipe 44, and circulates in the upstream indoor heat exchanger 32. The refrigerant having circulated in the upstream indoor heat exchanger 32 flows into the second main refrigerant pipe 41 through the fourth main refrigerant pipe 43 and the second branched refrigerant pipe 45. Meanwhile, the remaining part of the refrigerant flowing out from the high-pressure flow path switching device 50 flows into the second main refrigerant pipe 41 without circulating in the upstream indoor heat exchanger 32.

After joining together at the second main refrigerant pipe 41, the refrigerant flows into the outdoor heat exchanger 33. After absorbing heat from outdoor air, the refrigerant flowing into the outdoor heat exchanger 33 passes through the third main refrigerant pipe 42 and the third branched refrigerant pipe 46 in this order, and is sucked into the electric compressor 30 through the accumulator 34.

In any of the air-heating start-up operation mode, the normal air-heating operation mode, the air-cooling operation mode, and the defrosting operation mode, the downstream indoor heat exchanger 31 serves as a radiator.

Moreover, in any of the foregoing operation modes, the refrigerant pipe through which refrigerant flows into the outdoor heat exchanger 33 is the second main refrigerant pipe 41, and the refrigerant pipe through which refrigerant flows out from the outdoor heat exchanger 33 is the third main refrigerant pipe 42. Thus, in the outdoor heat exchanger 33, refrigerant always flows in one direction. The outdoor heat exchanger 33 may be configured considering only distribution of refrigerant in one direction, and therefore, the heat exchange performance of the outdoor heat exchanger 33 can be relatively easily enhanced as compared to the case of a heat pump device configured such that refrigerant reversibly flows.

In any of the foregoing operation modes, after refrigerant flows through the downstream ones of the tubes 49a of the downstream indoor heat exchanger 31 in the flow direction of air, the refrigerant can flow through the upstream ones of the tubes 49a of the downstream indoor heat exchanger 31 in the flow direction of air, and then can be discharged. Thus, the downstream indoor heat exchanger 31 can be in such countercurrent arrangement that the flow of refrigerant in the downstream indoor heat exchanger 31 is countercurrent to the flow of outdoor air. Similarly, in any of the foregoing operation modes, after refrigerant flows through downstream ones of tubes (not shown) of the upstream indoor heat exchanger 32 in the flow direction of air, the refrigerant can flow through upstream ones of the tubes of the upstream indoor heat exchanger 32 in the flow direction of air, and then can be discharged. Thus, the upstream indoor heat exchanger 32 can be also in the countercurrent arrangement.

Since the downstream indoor heat exchanger 31 is in the countercurrent arrangement, higher-temperature refrigerant flows through the downstream part of the downstream indoor heat exchanger 31 in the flow direction of air particularly in the normal air-heating operation mode. Thus, air-heating can be efficiently performed, and air-heating performance can be improved.

Moreover, since the upstream indoor heat exchanger 32 is in the countercurrent arrangement, lower-temperature refrigerant flows through the downstream part of the upstream indoor heat exchanger 32 in the flow direction of air particularly in the air-cooling operation mode. Thus, air-cooling can be efficiently performed, and air-cooling performance can be improved.

Figure 2:
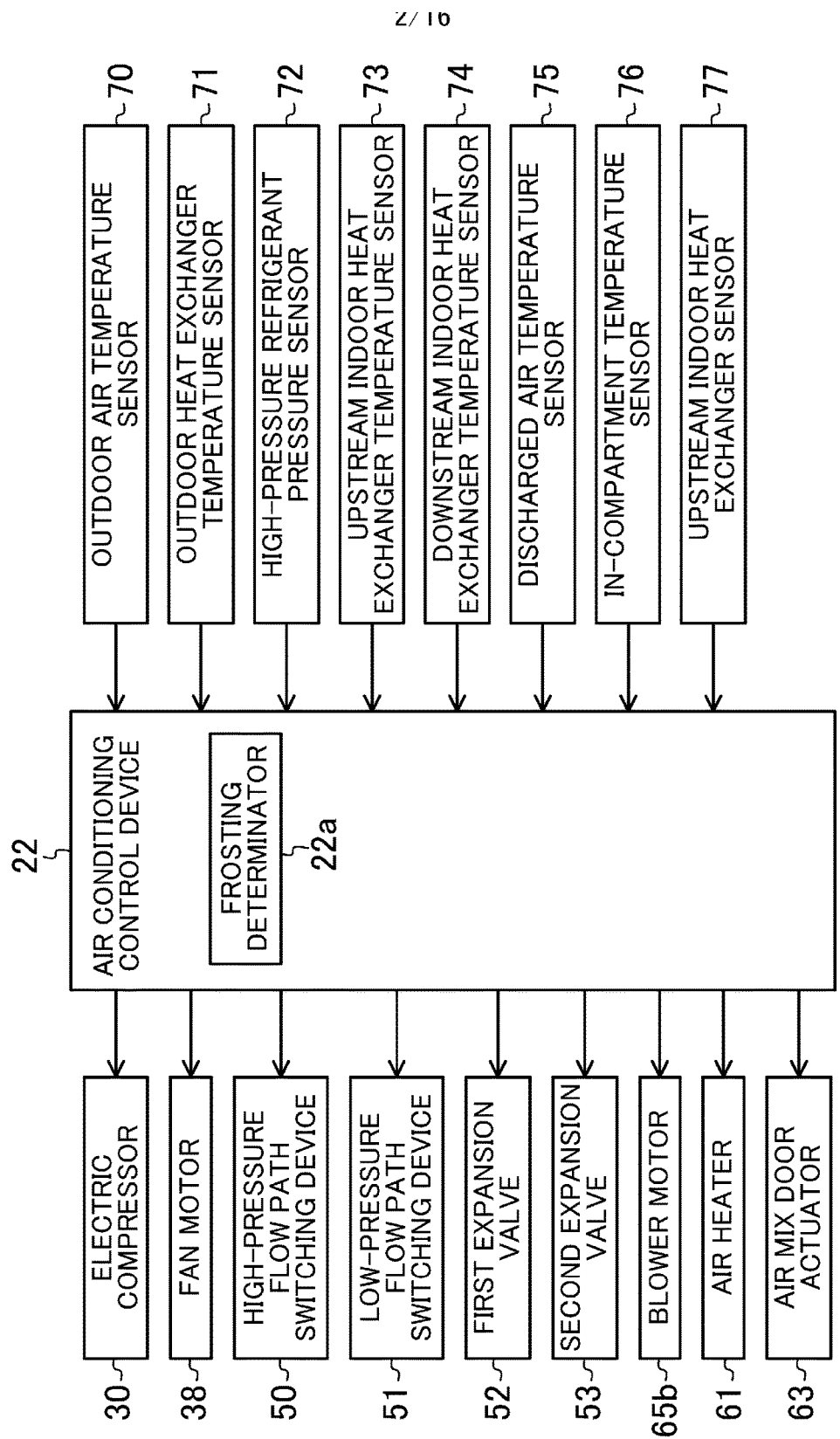
FIG. 2 is a block diagram of the vehicle air conditioner.

Referring to FIG. 2, the air conditioning control device 22 includes a frosting determinator 22a configured to determine whether or not frost is formed on the outdoor heat exchanger 33. The frosting determinator 22a determines that frost is formed on the outdoor heat exchanger 33 when a value obtained by subtracting the surface temperature of the outdoor heat exchanger 33 determined by the outdoor heat exchanger temperature sensor 71 from the outdoor air temperature (TG) determined by the outdoor air temperature sensor 70 is greater than, e.g., 20 (° C.). That is, frosting determination is performed based on the fact that, when frost is formed on the outdoor heat exchanger 33, refrigerant cannot absorb heat in the outdoor heat exchanger 33 and a refrigerant temperature does not increase. Thus, a value of "20" may be other values as long as it can be, based on such a value, determined whether or not frost is formed on the outdoor heat exchanger 33.

Figure 9:
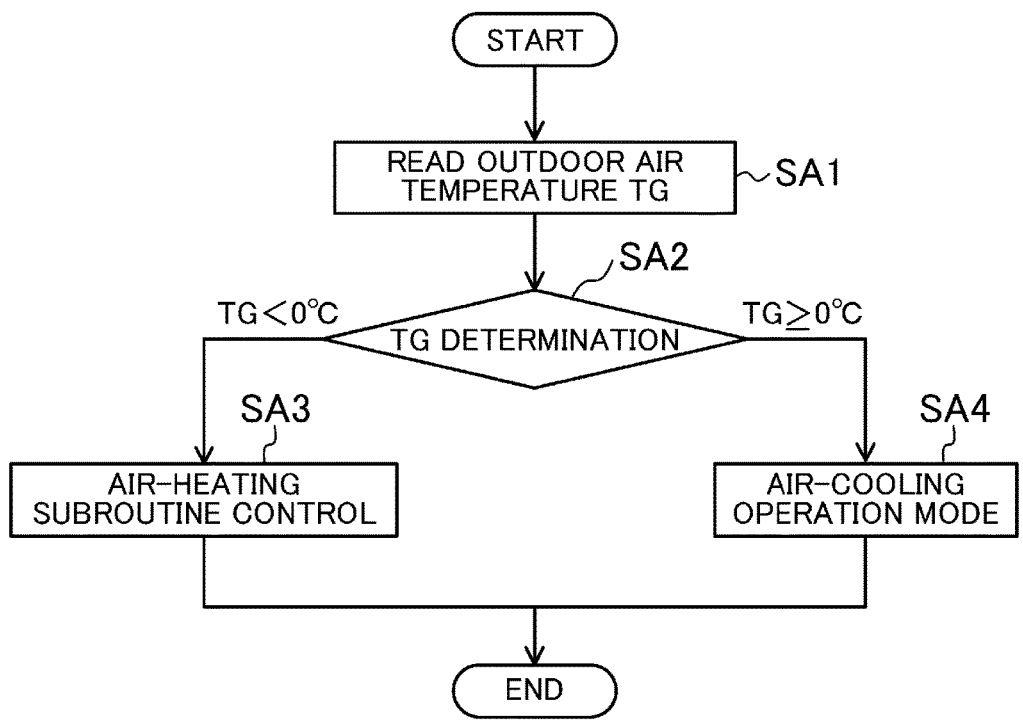
FIG. 9 is a flowchart showing the steps of a control performed by an air conditioning control device.
Figure 10:
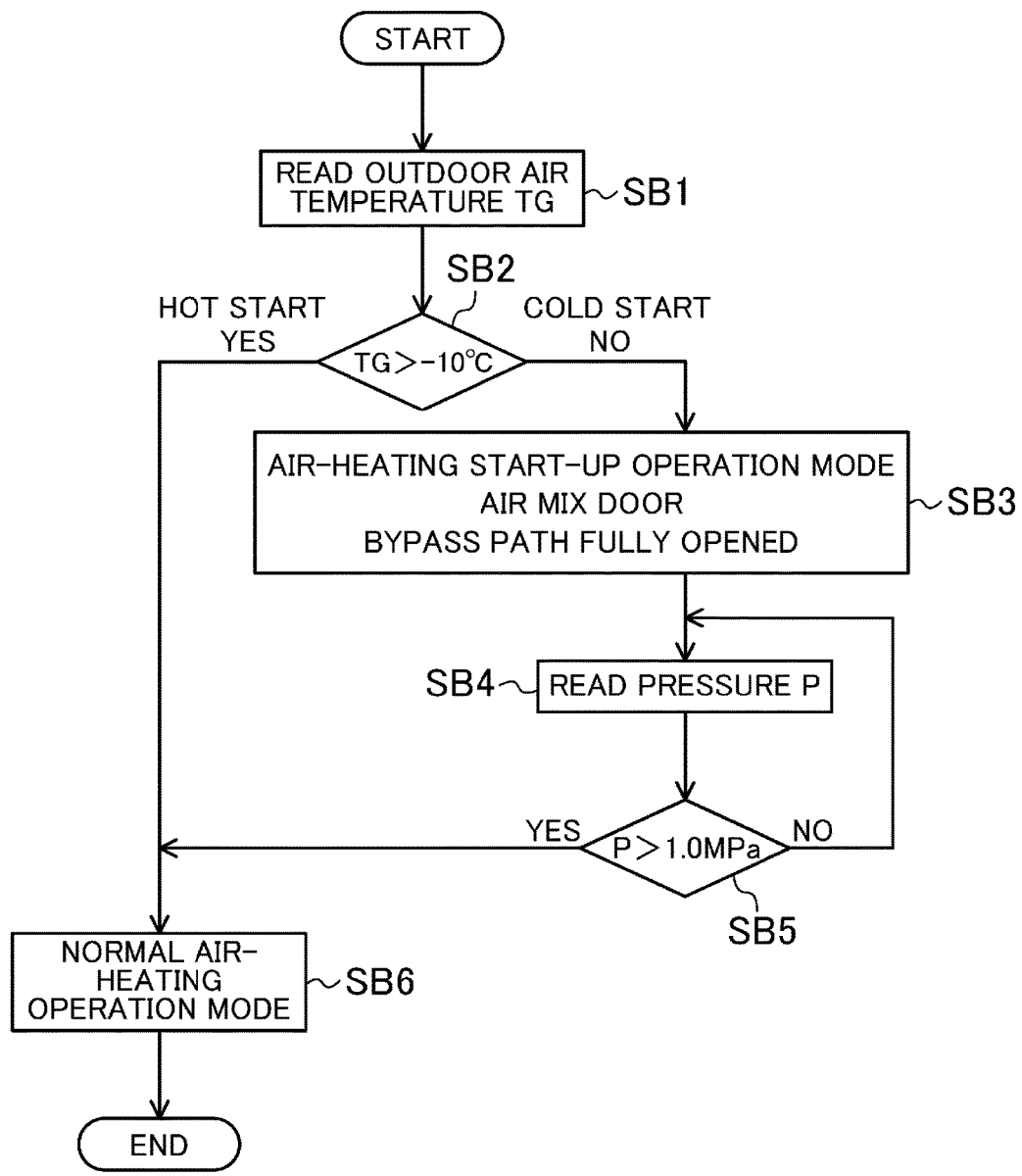
FIG. 10 is a flowchart showing the steps of an air-heating subroutine control of the first embodiment.

Next, the steps of the control performed by the air conditioning control device 22 will be described with reference to FIGS. 9 and 10. FIG. 9 shows the main routine. At step SA1 after "START," an outdoor air temperature (TG) determined by the outdoor air temperature sensor 70 is read. At step SA2 subsequent to step SA1, it is determined whether the outdoor air temperature (TG) is lower than 0° C. or equal to or higher than 0° C.

When it is, at step SA2, determined that the outdoor air temperature (TG) is lower than 0° C., the process proceeds to step SA3. An air-heating subroutine control shown in FIG. 10 is performed, and the process proceeds to "END" of the main routine. In the air-heating subroutine control, the heat mode is mainly selected as the discharge mode of the indoor air conditioning unit 21. Moreover, the air mix door 62 operates such that the temperature of discharged air reaches a target temperature.

When it is, at step SA2, determined that the outdoor air temperature (TG) is equal to or higher than 0° C., the process proceeds to step SA4. Then, the heat pump device 20 is switched to the air-cooling operation mode, and the process proceeds to "END" of the main routine.

In the case where frost is formed on the outdoor heat exchanger 33, the defrosting operation mode is selected.

The air-heating subroutine control shown in the flowchart of FIG. 10 will be described. At step SB1 after "START," an outdoor air temperature (TG) determined by the outdoor air temperature sensor 70 is read.

At step SB2 subsequent to step SB1, it is determined whether or not the outdoor air temperature (TG) is higher than −10° C. When it is determined as "NO" at step SB2, i.e., the outdoor air temperature (TG) is equal to or lower than −10° C., a vehicle is assumed as being in a cold start state, and the process proceeds to step SB3. As a result, the air-heating start-up operation mode is selected as the operation mode. Note that a value of "−10" may be other values as long as it can be, based on such a value, determined whether or not the temperature of refrigerant on the high-pressure side in the heat pump device 20 is low.

Since the air mix door 62 fully opens the bypass path 60d in the air-heating start-up operation mode, the volume of air passing through the downstream indoor heat exchanger 31 is less in the air-heating start-up operation mode than in the normal air-heating operation mode.

Subsequently, the process proceeds to step SB4, and the output value of the high-pressure refrigerant pressure sensor 72, i.e., a refrigerant pressure (P) on the high-pressure side in the heat pump device 20, is read. The process proceeds to step SB5 after reading of the refrigerant pressure (P), and it is determined whether or not the refrigerant pressure (P) is higher than 1.0 MPa. When it is determined as "NO" at step SB5, i.e., the refrigerant pressure (P) is equal to or lower than 1.0 MPa, the process returns to step SB4. The refrigerant pressure (P) on the high-pressure side in the heat pump device 20 is read again, and the determination as in step SB5 is performed. That is, until the refrigerant pressure on the high-pressure side becomes higher than 1.0 MPa, it is estimated that the temperature of refrigerant on the high-pressure side in the heat pump device 20 is low, and therefore, the air-heating start-up operation mode is continued.

Note that a determination pressure value of 1.0 MPa may vary depending on the outdoor air temperature. For example, as the outdoor air temperature increases, the speed of increasing the temperature of refrigerant on the high-pressure side in the heat pump device 20 decreases. Accordingly, the determination pressure value is decreased.

When it is determined as "YES" at step SB5, i.e., the pressure of refrigerant on the high-pressure side in the heat pump device 20 is higher than 1.0 MPa, it is assumed that the refrigerant temperature is also high, and the air-heating start-up operation is no longer needed. In this case, the process proceeds to step SB6, and the air-heating start-up operation mode is switched to the normal air-heating operation mode.

When it is determined as "YES" at step SB2, i.e., the outdoor air temperature (TG) is higher than −10° C., it is assumed that the temperature of refrigerant on the high-pressure side in the heat pump device 20 is high, and the air-heating start-up operation is no longer needed. Thus, the process proceeds to step SB6, and the operation mode of the heat pump device 20 is switched to the normal air-heating operation mode.

As just described, the air conditioning control device 22 estimates, at steps SB2 and SB5, whether or not the temperature of refrigerant on the high-pressure side in the heat pump device 20 is equal to or lower than a predetermined low temperature. When it is estimated that the temperature of refrigerant on the high-pressure side in the heat pump device 20 is equal to or lower than the predetermined low temperature ("NO" at step SB4 and "NO" at step SB5), the operation is performed in the air-heating start-up operation mode. On the other hand, when it is estimated that the temperature of refrigerant on the high-pressure side in the heat pump device 20 is higher than the predetermined low temperature ("YES" at step SB2 and "YES" at step SB5), the operation is performed in the normal air-heating operation mode.

That is, the air conditioning control device 22 controls the air mix door 62 such that the volume of air sent to the downstream indoor heat exchanger 31 is lower in the case where it is estimated that the temperature of refrigerant on the high-pressure side in the heat pump device 20 is equal to or lower than the predetermined low temperature than in the case where it is estimated that the temperature of refrigerant on the high-pressure side in the heat pump device 20 is higher than the predetermined low temperature.

If the frosting determinator 22a determines, during the air-heating operation mode, that frost is formed on the outdoor heat exchanger 33, the operation mode of the heat pump device 20 is switched to the defrosting operation mode. When defrosting is completed, the operation mode of the heat pump device 20 is switched to the air-heating operation mode.

As described above, according to the first embodiment, it is estimated that the temperature of refrigerant on the high-pressure side is equal to or lower than the predetermined low temperature under the circumstances, such as the winter, that the outdoor air temperature is low and that refrigerant on the high-pressure side in the heat pump device 20 is cooled to a temperature close to the outdoor air temperature due to the heat pump device 20 being left uncontrolled for a long period of time. In such a case, since the air mix door 62 fully opens the bypass path 60d, the volume of air sent to the downstream indoor heat exchanger 31 is less than that in the normal air-heating operation mode. Thus, the amount of heat exchanged between outdoor air and refrigerant discharged from the electric compressor 30 while the refrigerant is circulating in the downstream indoor heat exchanger 31 can be reduced. Accordingly, a decrease in temperature of refrigerant on the high-pressure side in the heat pump device 20 can be reduced. Consequently, an increase in refrigerant pressure and refrigerant temperature accelerates, and therefore start-up of air-heating becomes faster. As a result, the degree of passenger's comfort can be improved.

Since the volume of air sent to the downstream indoor heat exchanger 31 is switched by the air mix door 62, it can be ensured that such an air volume is easily switched.

When it is determined that the refrigerant pressure becomes higher than the predetermined pressure, the heat pump device 20 and the indoor air conditioning unit 21 are switched from the air-heating start-up operation mode to the normal air-heating operation mode. Thus, the heat pump device 20 and the indoor air conditioning unit 21 can be switched to normal air-heating based on an actual refrigerant temperature. This allows normal air-heating at proper timing after start-up of air-heating.

The outdoor air temperature (TG) which is the temperature of air outside the vehicle compartment and the temperature of refrigerant on the high-pressure side in the heat pump device 20 relate to each other, and it is assumed that a lower outdoor air temperature (TG) results in a lower temperature of refrigerant on the high-pressure side in the heat pump device 20. In the present embodiment, the outdoor air temperature (TG) is determined to estimate the temperature of refrigerant on the high-pressure side in the heat pump device 20. Thus, the estimation results are accurate, and proper control can be performed.

In the foregoing embodiment, after the refrigerant pressure (P) on the high-pressure side is, at step SB4, read in the air-heating start-up operation mode, it is, at step SB5, determined whether the air-heating start-up operation mode should be continued or should be terminated to be switched to the normal air-heating operation mode. However, the present invention is not limited to such a configuration. For example, after the air-heating start-up operation mode begins, the heat pump device 20 and the indoor air conditioning unit 21 may be switched to the normal air-heating operation mode (normal air-heating control) when it is, at step SB4, determined that the refrigerant temperature determined by the upstream indoor heat exchanger pressure sensor 77 becomes higher than the predetermined temperature. In this case, an actual refrigerant temperature can be determined, and the heat pump device 20 and the indoor air conditioning unit 21 can be switched to normal air-heating based on the actual refrigerant temperature. This allows normal air-heating at proper timing after start-up of air-heating. As a result, the degree of passenger's comfort can be improved.

After the temperature of air having passed through the upstream indoor heat exchanger 32 is determined by the upstream indoor heat exchanger temperature sensor 73, and the air-heating start-up control begins, when it is determined that the air temperature determined by the upstream indoor heat exchanger temperature sensor 73 becomes higher than the predetermined temperature, the heat pump device 20 and the indoor air conditioning unit 21 may be switched to the normal air-heating operation mode.

In this case, the air-heating start-up operation mode can be switched to the normal air-heating operation mode based on the temperature of air having passed through the upstream indoor heat exchanger 32. This allows normal air-heating at proper timing. As a result, the degree of passenger's comfort can be further improved.

Note that the temperature used for the foregoing determination may vary depending on the outdoor air temperature. For example, since a lower outdoor air temperature results in a slower increase in temperature of refrigerant on the high-pressure side, a lower temperature is used for the determination.

Second Embodiment

Figure 11:
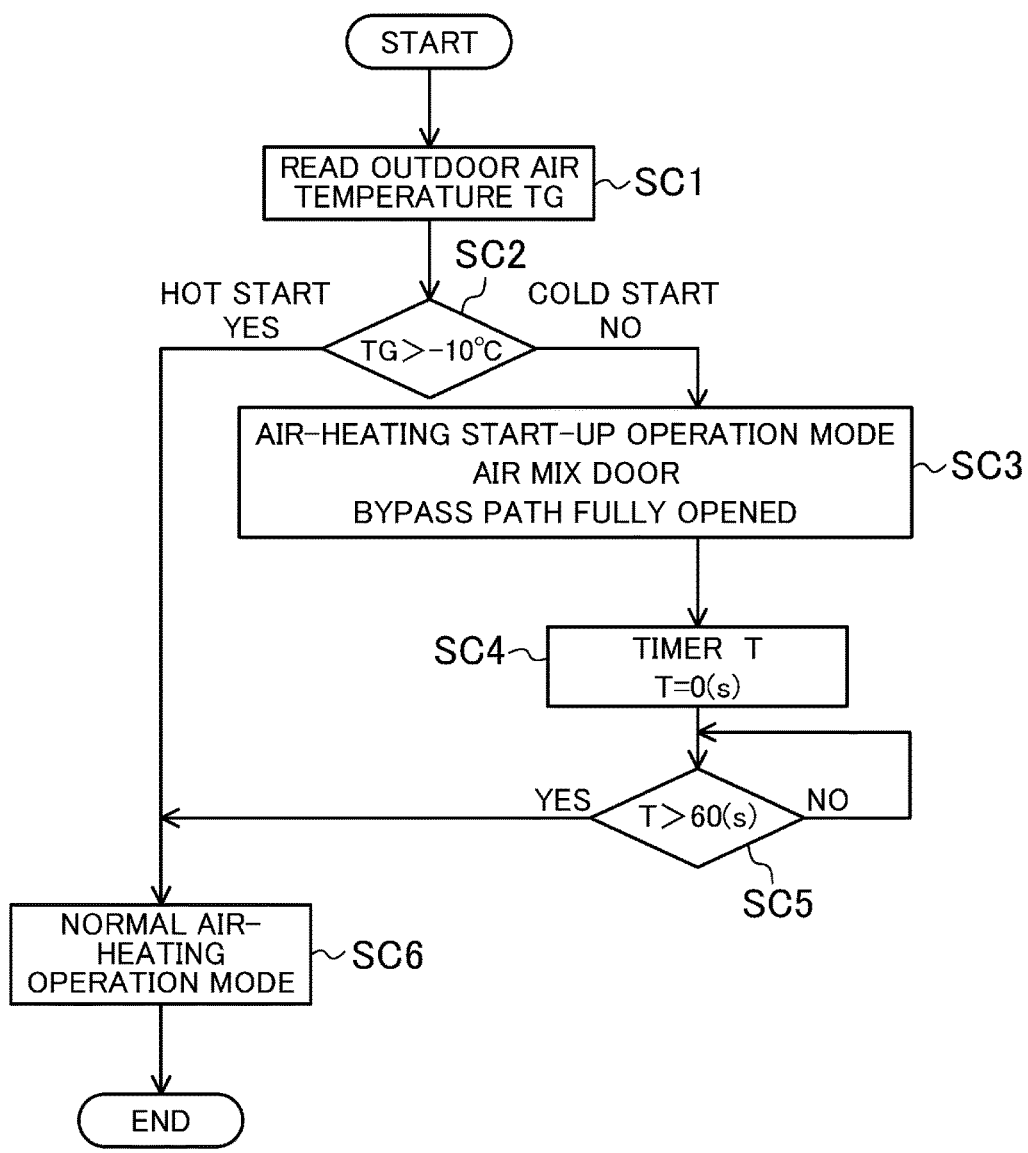
FIG. 11 is a flowchart showing the steps of an air-heating subroutine control of a second embodiment.

FIG. 11 is a flowchart showing the steps of an air-heating subroutine control of a second embodiment of the present invention. The second embodiment is similar to the first embodiment except for the steps of the air-heating subroutine control. The same reference numerals as those described in the first embodiment are used to represent equivalent elements in the second embodiment, and the description thereof will not be repeated. Differences between the first and second embodiments will be described in detail.

At step SC1 of the flowchart shown in FIG. 11, an outdoor air temperature (TG) determined by an outdoor air temperature sensor 70 is read.

At step SC2 subsequent to step SC1, it is determined whether or not the outdoor air temperature (TG) is higher than −10° C. When it is determined as "NO" at step SC2, i.e., the outdoor air temperature (TG) is equal to or lower than −10° C., a vehicle is assumed as being in a cold start state, and the process proceeds to step SC3. As a result, an air-heating start-up operation mode is selected as an operation mode.

Subsequently, the process proceeds to step SC4, and timing begins with a timer being set at "0." The time elapsed after beginning of the air-heating start-up operation mode can be obtained by the timer.

Then, the process proceeds to step SC5, and it is determined whether or not the time obtained by the timer exceeds 60 seconds, i.e., whether or not a predetermined period of time has elapsed after beginning of the air-heating start-up operation mode. When it is determined as "NO" at step SC5, i.e., the timer shows that 60 seconds have not elapsed, the determination as in step SC5 is performed again, and the process stands by until 60 seconds have elapsed.

When it is determined as "YES" at step SC5, i.e., the timer shows that 60 seconds have elapsed, the process proceeds to step SC6, and the air-heating start-up operation mode is switched to a normal air-heating operation mode.

That is, in the second embodiment, when the predetermined time has elapsed after beginning of the air-heating start-up operation mode, the heat pump device 20 and an indoor air conditioning unit 21 are switched to the normal air-heating operation mode. The steps of estimating whether or not the temperature of refrigerant on a high-pressure side in the heat pump device 20 is equal to or lower than a predetermined low temperature are steps SC2, SC5.

Thus, according to the second embodiment, under the circumstances that refrigerant on the high-pressure side in the heat pump device 20 is cooled to a temperature close to an outdoor air temperature, an air mix door 62 fully opens a bypass path 60d, and therefore the volume of air sent to a downstream indoor heat exchanger 31 is less than that in the normal air-heating operation mode as in the first embodiment. Accordingly, a decrease in temperature of refrigerant can be reduced. Consequently, an increase in refrigerant pressure and refrigerant temperature on the high-pressure side in the heat pump device 20 accelerates, and therefore, start-up of air-heating becomes faster. As a result, the degree of passenger's comfort can be improved.

Moreover, since the air-heating start-up operation mode is switched to the normal air-heating operation mode based on the time elapsed after beginning of the air-heating start-up operation mode, a simple control can be achieved, and normal air-heating can be performed at proper timing.

Further, the time (predetermined time) before switching to the normal air-heating operation mode and after beginning of the air-heating start-up operation mode may vary depending on the outdoor air temperature. Specifically, the predetermined time is set to be longer as the outdoor air temperature decreases. In the case of a low outdoor air temperature during an extremely-cold period, it is assumed that the time required for start-up of air-heating is long. In such a case, a long time before switching to the normal air-heating operation mode and after beginning of an air-heating start-up control is ensured, thereby performing normal air-heating at proper timing.

Moreover, the time (predetermined time) before switching to the normal air-heating operation mode and after beginning of the air-heating start-up operation mode may vary depending on the pressure of refrigerant on the high-pressure side. Specifically, the predetermined time is set to be longer as the pressure of refrigerant on the high-pressure side increases. In the case of a low outdoor air temperature during an extremely-cold period, it is assumed that the pressure of refrigerant on the high-pressure side is low and that the time required for start-up of air-heating is long. In such a case, a long time before switching to the normal air-heating operation mode and after beginning of the air-heating start-up control is ensured, thereby performing normal air-heating at proper timing.

Third Embodiment

Figure 12:
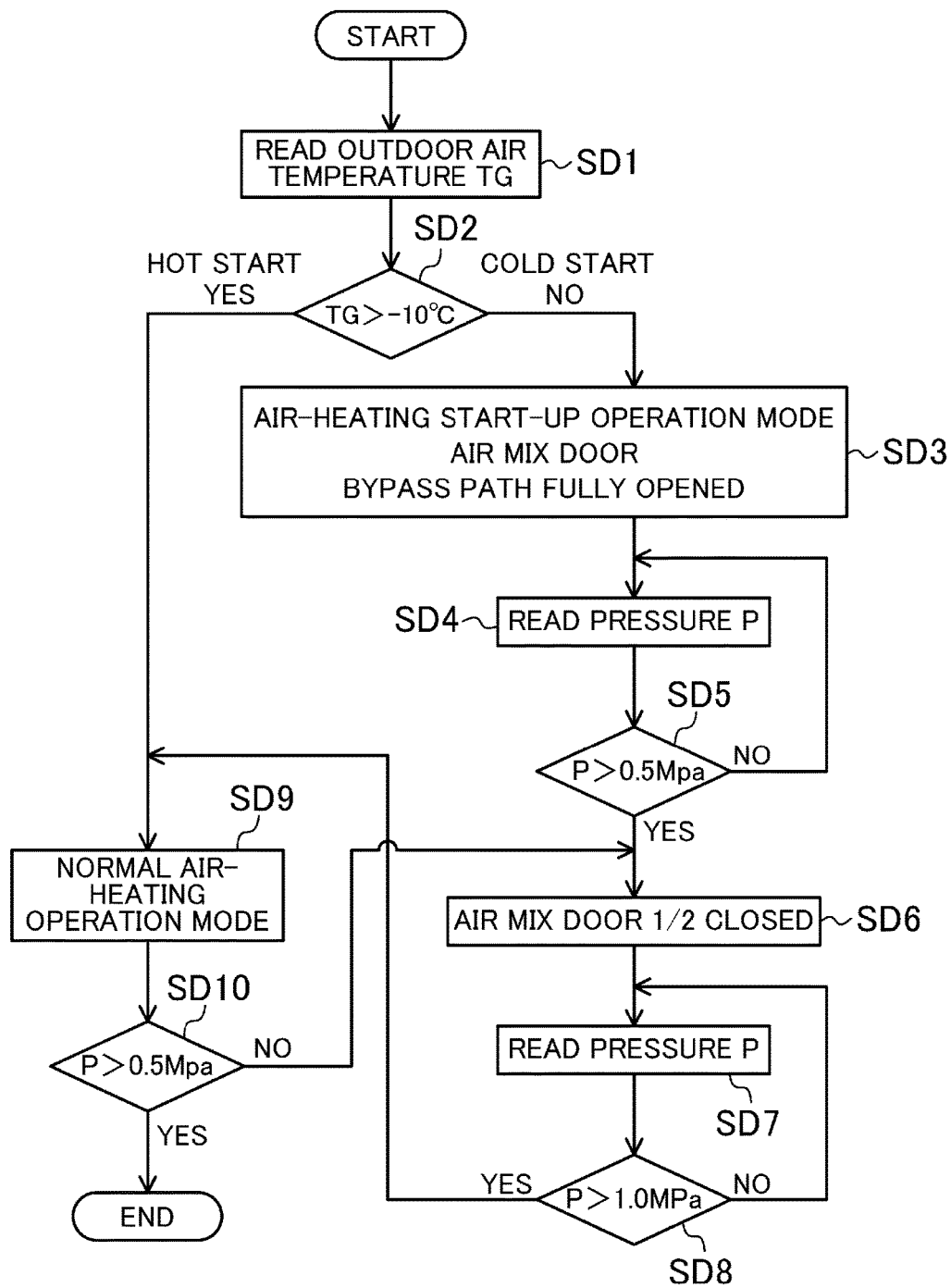
FIG. 12 is a flowchart showing the steps of an air-heating subroutine control of a third embodiment.

FIG. 12 is a flowchart showing the steps of an air-heating subroutine control of a third embodiment of the present invention. The third embodiment is similar to the first embodiment except for the steps of the air-heating subroutine control. The same reference numerals as those described in the first embodiment are used to represent equivalent elements in the third embodiment, and the description thereof will not be repeated. Differences between the first and third embodiments will be described in detail.

At step SD1 of the flowchart shown in FIG. 12, an outdoor air temperature (TG) determined by an outdoor air temperature sensor 70 is read.

At step SD2 subsequent to step SD1, it is determined whether or not the outdoor air temperature (TG) is higher than −10° C. When it is determined as "NO" at step SD2, i.e., the outdoor air temperature (TG) is equal to or lower than −10° C., a vehicle is assumed as being in a cold start state, and the process proceeds to step SD3. As a result, an air-heating start-up operation mode is selected as an operation mode.

Subsequently, the process proceeds to step SD4, and the output value of a high-pressure refrigerant pressure sensor 72, i.e., a refrigerant pressure (P) on a high-pressure side in a heat pump device 20, is read. The process proceeds to step SD5 after reading of the refrigerant pressure (P), and it is determined whether or not the refrigerant pressure (P) is higher than 0.5 MPa. When it is determined as "NO" at step SD5, i.e., the refrigerant pressure (P) is equal to or lower than 0.5 MPa, the process returns to step SD4. The refrigerant pressure (P) on the high-pressure side in the heat pump device 20 is read again, and the determination as in step SD5 is performed. Meanwhile, the air-heating start-up operation mode is continued.

When it is determined as "YES" at step SD5, i.e., the pressure of refrigerant on the high-pressure side is higher than 0.5 MPa, it is estimated that a refrigerant temperature is high. In this case, the process proceeds to step SD6 to cause an air mix door 62 to be in a half-open state. That is, air having passed through an upstream indoor heat exchanger 32 flows through both of a downstream indoor heat exchanger 31 and a bypass path 60d, and therefore, such air is also heated by the downstream indoor heat exchanger 31. Note that the air mix door 62 may be in a one-third open state or a two-third open state.

Then, the process proceeds to step SD7, and the refrigerant pressure (P) on the high-pressure side in the heat pump device 20 is read. After the refrigerant pressure (P) is read, the process proceeds to step SD8, and it is determined whether or not the refrigerant pressure (P) is higher than 1.0 MPa. When it is determined as "NO" at step SD8, i.e., the refrigerant pressure (P) is equal to or lower than 1.0 MPa, the process returns to step SD7. The refrigerant pressure (P) on the high-pressure side in the heat pump device 20 is read again, and the foregoing determination is performed again at step SD8. Meanwhile, the air-heating start-up operation mode is continued.

Note that a determination pressure value of 1.0 MPa may vary depending on the outdoor air temperature. For example, since a lower outdoor air temperature results in a slower increase in refrigerant temperature on the high-pressure side, a smaller determination pressure value is set.

With a change in determination pressure value of 1.0 MPa, the determination pressure value (0.5 MPa) at step SD5 may be changed.

When it is determined as "YES" at step SD8, i.e., the pressure of refrigerant on the high-pressure side is higher than 1.0 MPa, the process proceeds to step SD9, and the air-heating start-up operation mode is switched to the normal air-heating operation mode. This increases the volume of air sent to the downstream indoor heat exchanger 31. An increase in volume of air sent to the downstream indoor heat exchanger 31 may result in a decrease in pressure of refrigerant on the high-pressure side.

In order to cope with such a state, it is, at step SD10, determined again whether or not the refrigerant pressure (P) on the high-pressure side in the heat pump device 20 is higher than 0.5 MPa.

When it is determined as "NO" at step SD10, i.e., the refrigerant pressure (P) on the high-pressure side is decreased to equal to or lower than 0.5 MPa, the process returns to step SD6, and the volume of air sent to the downstream indoor heat exchanger 31 is decreased by putting the air mix door 62 into the half-open state. Then, the process stands by until the pressure of refrigerant on the high-pressure side increases after steps SD7, SD8.

When it is determined as "YES" at step SD10, i.e., the pressure (P) on the high-pressure side is higher than 0.5 MPa, the process proceeds to "END."

Thus, according to the third embodiment, under the circumstances that refrigerant on the high-pressure side in the heat pump device 20 is cooled to a temperature close to the outdoor air temperature, the air mix door 62 fully opens the bypass path 60d, and therefore, the volume of air sent to the downstream indoor heat exchanger 31 is less than that in the normal air-heating operation mode as in the first embodiment. Accordingly, a decrease in temperature of refrigerant can be reduced. Consequently, an increase in refrigerant pressure and refrigerant temperature on the high-pressure side in the heat pump device 20 accelerates, and therefore, start-up of air-heating becomes faster. As a result, the degree of passenger's comfort can be improved.

The form of the air mix door 62 is not limited, and the air mix door 62 may be in the form of a plate or a film.

The case where two heat exchangers, i.e., the downstream indoor heat exchanger 31 and the upstream indoor heat exchanger 32, are the indoor heat exchangers serving as radiators has been described in the foregoing embodiments, and the present invention is not limited to such a case. The present invention is applicable to the case where a single indoor heat exchanger serves as a radiator (see the air conditioner of Patent Document 1). That is, the air mix door 62 is controlled such that the volume of air sent to the indoor heat exchanger serving as a radiator in both of the air-heating operation mode and the air-cooling operation mode is less in the case where it is estimated that the temperature of refrigerant on the high-pressure side in the heat pump device 20 is equal to or lower than a predetermined low temperature than in the case where it is estimated that the temperature of refrigerant on the high-pressure side in the heat pump device 20 is higher than the predetermined low temperature.

In this case, features and advantages similar to those of the foregoing embodiments can be achieved.

In estimating whether or not the temperature of refrigerant on the high-pressure side in the heat pump device 20 is equal to or lower than the predetermined low temperature, it may be estimated based on an output value of a temperature sensor capable of determining the temperature of refrigerant on the high-pressure side, it may be estimated by determining the pressure of refrigerant on the high-pressure side, or it may be estimated based on the time elapsed after beginning of air-heating. The estimation method is not limited.

In the foregoing embodiments, it is estimated whether or not the temperature of refrigerant on the high-pressure side in the heat pump device 20 is equal to or lower than the predetermined low temperature, and the air-heating start-up control is performed when the temperature of refrigerant on the high-pressure side in the heat pump device 20 is estimated as being equal to or lower than the predetermined low temperature. The present invention is not limited to such a configuration. For example, the air-heating start-up control may be, at the beginning of air-heating, performed regardless of the temperature of refrigerant on the high-pressure side, followed by switching the air-heating start-up operation to the normal air-heating operation. The air-heating start-up operation may be switched to the normal air-heating operation at, e.g., the timing at which a predetermined period of time has elapsed after beginning of air-heating.

Fourth Embodiment

A fourth embodiment of the present invention will be described with reference to FIGS. 13 to 15. The fourth embodiment is different from the first embodiment in details of a control. The same reference numerals as those described in the first embodiment are used to represent equivalent elements in the fourth embodiment, and the description thereof will not be repeated. Differences between the first and fourth embodiments will be described in detail.

Figure 13:
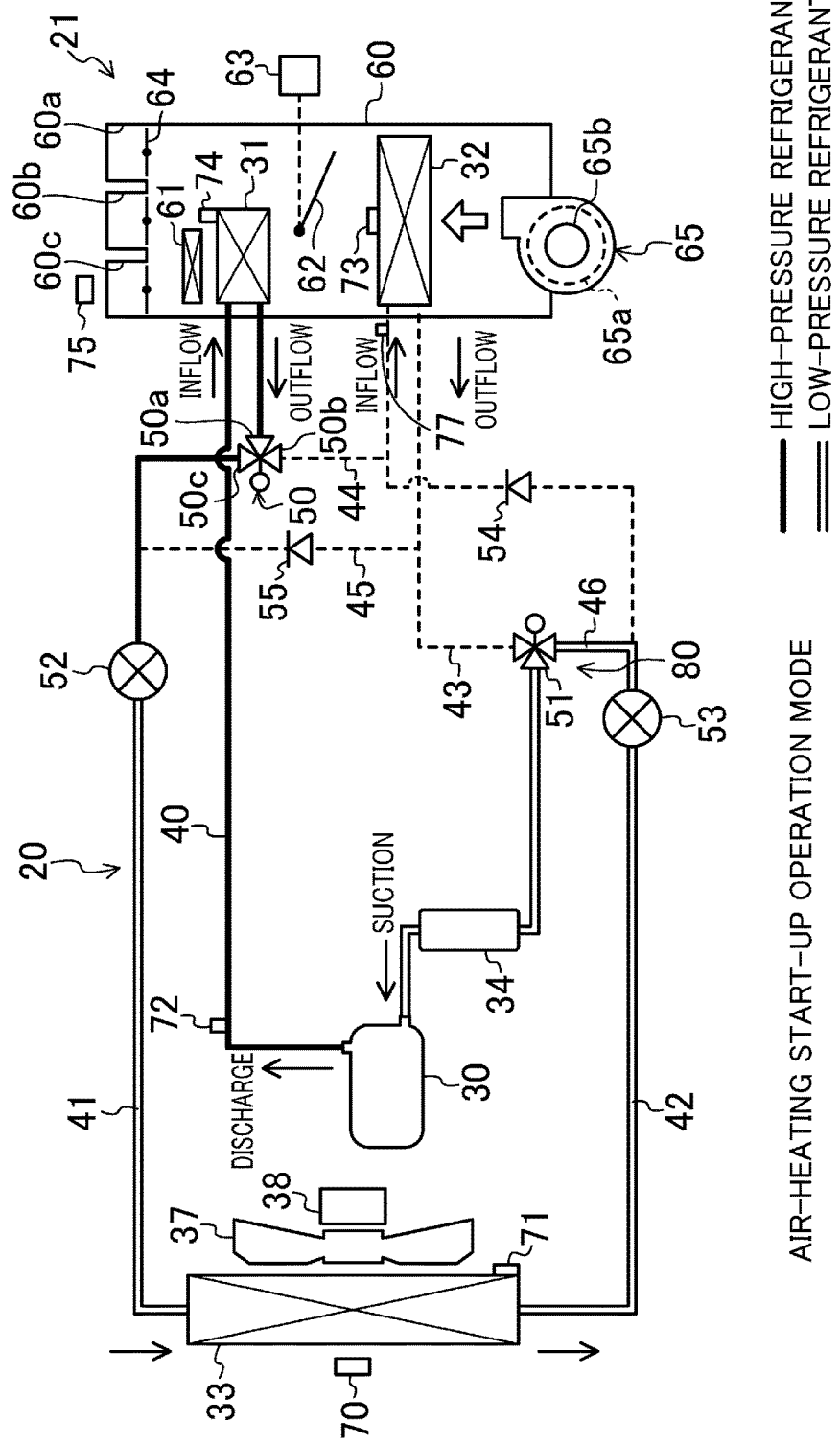
FIG. 13 is a diagram illustrating the case of an air-heating start-up operation mode of a fourth embodiment and corresponding to FIG. 1.

Referring to FIG. 13, a high-pressure flow path switching device 50 forms a flow path switching device of the present invention, and is an electric three-way valve controlled by an air conditioning control device 22. The high-pressure flow path switching device 50 is disposed at the position in the middle of a second main refrigerant pipe 41, and is connected to a first branched refrigerant pipe 44.

The high-pressure flow path switching device 50 includes a refrigerant inlet 50a which is connected to a downstream indoor heat exchanger 31 through the second main refrigerant pipe 41 such that refrigerant flows into the refrigerant inlet 50a from the downstream indoor heat exchanger 31, a normal air-heating refrigerant outlet 50b which is connected to an upstream indoor heat exchanger 32 through the first branched refrigerant pipe 44 such that refrigerant flowing into the refrigerant inlet 50a flows into the upstream indoor heat exchanger 32, and an air-heating start-up refrigerant outlet 50c which causes refrigerant flowing into the refrigerant inlet 50a to bypass the upstream indoor heat exchanger 32. The air-heating start-up refrigerant outlet 50c is connected to an outdoor heat exchanger 33 through the second main refrigerant pipe 41 so that refrigerant flowing into the refrigerant inlet 50a can flows into an outdoor heat exchanger 33.

Although not shown, a switching valve is built in the high-pressure flow path switching device 50. Such a switching valve operates to switch among a normal air-heating operation mode in which refrigerant flowing into the refrigerant inlet 50a flows into the normal air-heating refrigerant outlet 50b, an air-heating start-up operation mode in which refrigerant flowing into the refrigerant inlet 50a flows into the air-heating start-up refrigerant outlet 50c, and an intermediate air-heating operation mode in which refrigerant flowing into the refrigerant inlet 50a flows into the normal air-heating refrigerant outlet 50b and the air-heating start-up refrigerant outlet 50c. The proportion of distribution of refrigerant flowing into the normal air-heating refrigerant outlet 50b and the air-heating start-up refrigerant outlet 50c in the intermediate air-heating operation mode can be optionally changed.

Note that the high-pressure flow path switching device 50 and a low-pressure flow path switching device 51 are both electric three-way valves, but an electric valve or an electromagnetic valve may be separately provided at each outlet pipe to switch a flow path.

A vehicle air conditioner 1 includes an outdoor air temperature sensor 70, an outdoor heat exchanger temperature sensor 71, a high-pressure refrigerant pressure sensor (first pressure sensor) 72, an upstream indoor heat exchanger temperature sensor (second temperature sensor) 73, a downstream indoor heat exchanger temperature sensor (first temperature sensor) 74, a discharged air temperature sensor 75, and an upstream indoor heat exchanger pressure sensor (second pressure sensor) 77. These sensors 70-75 and 77 are connected to the air conditioning control device 22.

The air-heating start-up operation mode of the fourth embodiment is performed as illustrated in, e.g., FIG. 13. In the air-heating start-up operation mode illustrated in FIG. 13, the downstream indoor heat exchanger 31 serves as a radiator, and the outdoor heat exchanger 33 serves as a heat absorber. Moreover, no refrigerant flows into the upstream indoor heat exchanger 32. In the air-heating start-up operation mode, the high-pressure flow path switching device 50 is switched to the air-heating start-up operation mode. In addition, the low-pressure flow path switching device 51 switches the flow path to cause refrigerant flowing out from the outdoor heat exchanger 33 to flow into an accumulator 34. A first expansion valve 52 is in an expansion state, and a second expansion valve 53 is in a non-expansion state.

When an electric compressor 30 operates in the foregoing state, high-pressure refrigerant discharged from the electric compressor 30 flows into the downstream indoor heat exchanger 31 through the first main refrigerant pipe 40, and circulates in the downstream indoor heat exchanger 31. The refrigerant having circulated in the downstream indoor heat exchanger 31 flows into the refrigerant inlet 50a of the high-pressure flow path switching device 50 through the second main refrigerant pipe 41. Since the high-pressure flow path switching device 50 is in the air-heating start-up operation mode, the refrigerant flowing into the refrigerant inlet 50a flows into the second main refrigerant pipe 41 through the air-heating start-up refrigerant outlet 50c. The refrigerant is expanded by passing through the first expansion valve 52, and then, flows into the outdoor heat exchanger 33. The refrigerant flowing into the outdoor heat exchanger 33 absorbs heat from outdoor air. Then, the refrigerant passes through a third main refrigerant pipe 42 and a third branched refrigerant pipe 46 in this order, and is sucked into the electric compressor 30 through the accumulator 34.

In the air-heating start-up operation mode, refrigerant discharged from the electric compressor 30 circulates in the downstream indoor heat exchanger 31, but does not circulate in the upstream indoor heat exchanger 32. Thus, the total volume of the refrigerant path in the heat pump device 20 is small. Thus, an increase in temperature and pressure of refrigerant on a high-pressure side accelerates.

Figure 14:
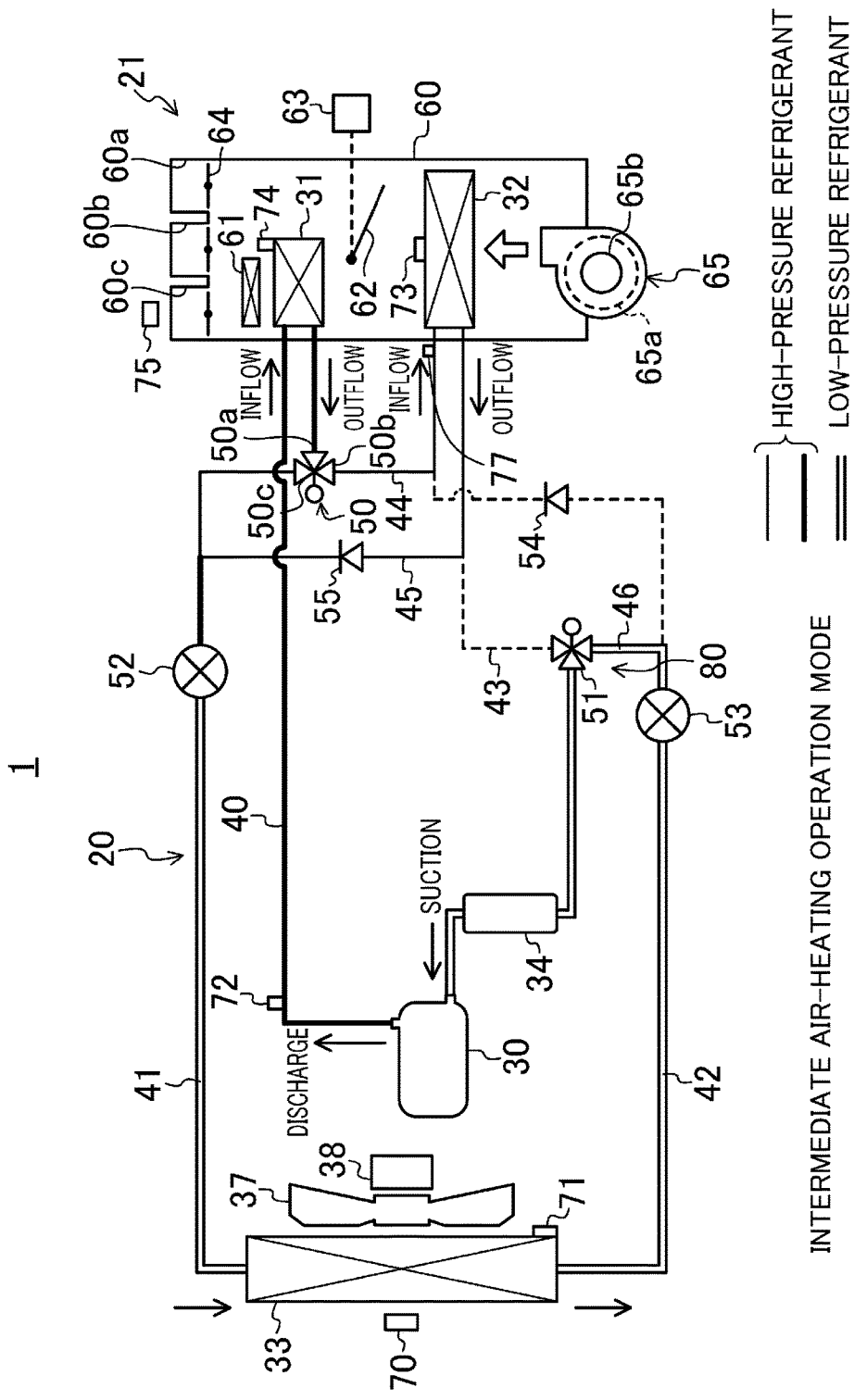
FIG. 14 is a diagram illustrating the case of an intermediate air-heating operation mode of the fourth embodiment and corresponding to FIG. 1.

In the fourth embodiment, the intermediate air-heating operation mode illustrated in FIG. 14 is performed. The intermediate air-heating operation mode is selected while the air-heating start-up operation mode shifts, after completion thereof, to the normal air-heating operation mode.

In the intermediate air-heating operation mode, the downstream indoor heat exchanger 31 and the upstream indoor heat exchanger 32 serve as radiators, and the outdoor heat exchanger 33 serves as a heat absorber.

That is, the high-pressure flow path switching device 50 is switched to the intermediate air-heating operation mode. In addition, the low-pressure flow path switching device 51 switches the flow path to cause refrigerant flowing out from the outdoor heat exchanger 33 to flow into the accumulator 34. The first expansion valve 52 is in the expansion state, and the second expansion valve 53 is in the non-expansion state.

When the electric compressor 30 operates in the foregoing state, high-pressure refrigerant discharged from the electric compressor 30 flows into the downstream indoor heat exchanger 31 through the first main refrigerant pipe 40, and circulates in the downstream indoor heat exchanger 31. The refrigerant having circulated in the downstream indoor heat exchanger 31 flows into the refrigerant inlet 50a of the high-pressure flow path switching device 50 through the second main refrigerant pipe 41. Since the high-pressure flow path switching device 50 is in the intermediate air-heating operation mode, the refrigerant flowing into the refrigerant inlet 50a flows out from the normal air-heating refrigerant outlet 50b and the air-heating start-up refrigerant outlet 50c.

The refrigerant flowing out from the normal air-heating refrigerant outlet 50b flows into the upstream indoor heat exchanger 32 through the first branched refrigerant pipe 44, and circulates in the upstream indoor heat exchanger 32. The refrigerant having circulated in the upstream indoor heat exchanger 32 flows from a fourth main refrigerant pipe 43 to the second main refrigerant pipe 41 through a second branched refrigerant pipe 45.

Meanwhile, the refrigerant flowing out from the air-heating start-up refrigerant outlet 50c flows into the second main refrigerant pipe 41 without circulating in the upstream indoor heat exchanger 32. At part of the second main refrigerant pipe 41 upstream of the first expansion valve 52, the refrigerant flowing out from the normal air-heating refrigerant outlet 50b and the refrigerant flowing out from the air-heating start-up refrigerant outlet 50c join together.

After joining together at the second main refrigerant pipe 41, the refrigerant is expanded by passing through the first expansion valve 52, and flows into the outdoor heat exchanger 33. The refrigerant flowing into the outdoor heat exchanger 33 absorbs heat from outdoor air. Then, the refrigerant passes through the third main refrigerant pipe 42 and the third branched refrigerant pipe 46 in this order, and is sucked into the electric compressor 30 through the accumulator 34.

In any of the air-heating start-up operation mode, the normal air-heating operation mode, the intermediate air-heating operation mode, an air-cooling operation mode, and a defrosting operation mode, the downstream indoor heat exchanger 31 serves as a radiator in this example.

Moreover, in any of the foregoing operation modes, the refrigerant pipe through which refrigerant flows into the outdoor heat exchanger 33 is the second main refrigerant pipe 41, and the refrigerant pipe through which refrigerant flows out from the outdoor heat exchanger 33 is the third main refrigerant pipe 42. Thus, in the outdoor heat exchanger 33, refrigerant always flows in one direction. The outdoor heat exchanger 33 may be configured considering only distribution of refrigerant in one direction, and therefore, the heat exchange performance of the outdoor heat exchanger 33 can be relatively easily enhanced as compared to the case of a heat pump device configured such that refrigerant reversibly flows.

In any of the foregoing operation modes, after refrigerant flows through downstream ones of tubes 49a of the downstream indoor heat exchanger 31 in the flow direction of air, the refrigerant can flow through upstream ones of the tubes 49a of the downstream indoor heat exchanger 31 in the flow direction of air, and then, can be discharged. Thus, the downstream indoor heat exchanger 31 can be in such countercurrent arrangement that the flow of refrigerant in the downstream indoor heat exchanger 31 is countercurrent to the flow of outdoor air. Similarly, in any of the foregoing operation modes, after refrigerant flows through downstream ones of tubes (not shown) of the upstream indoor heat exchanger 32 in the flow direction of air, the refrigerant can flow through upstream ones of the tubes of the upstream indoor heat exchanger 32 in the flow direction of air, and then, can be discharged. Thus, the upstream indoor heat exchanger 32 can be also in the countercurrent arrangement.

Since the downstream indoor heat exchanger 31 is in the countercurrent arrangement, higher-temperature refrigerant flows through a downstream part of the downstream indoor heat exchanger 31 in the flow direction of air particularly in the normal air-heating operation mode. Thus, air-heating can be efficiently performed, and air-heating performance can be improved.

Moreover, since the upstream indoor heat exchanger 32 is in the countercurrent arrangement, lower-temperature refrigerant flows through a downstream part of the upstream indoor heat exchanger 32 in the flow direction of air particularly in the air-cooling operation mode. Thus, air-cooling can be efficiently performed, and air-cooling performance can be improved.

Next, the steps of the control performed by the air conditioning control device 22 will be described. A main routine of the fourth embodiment is the same as that of the first embodiment. First, an outdoor air temperature (TG) is read at step SA1 after "START" of the main routine of the first embodiment as illustrated in FIG. 9. When it is, at step SA2, determined that the outdoor air temperature (TG) is lower than 0° C., the process proceeds to step SA3. An air-heating subroutine control illustrated in FIG. 15 is performed, and the process proceeds to "END" of the main routine. In the air-heating subroutine control, a heat mode is mainly selected as a discharge mode of the indoor air conditioning unit 21. Moreover, an air mix door 62 operates such that the temperature of discharged air reaches a target temperature.

When it is, at step SA2, determined that the outdoor air temperature (TG) is equal to or higher than 0° C., the process proceeds to step SA4. The heat pump device 20 is switched to the air-cooling operation mode, and the process proceeds to "END" of the main routine.

If frost is formed on the outdoor heat exchanger 33, the defrosting operation mode is selected.

The air-heating subroutine control shown in the flowchart of FIG. 15 will be described. At step SB1 subsequent to "START," an outdoor air temperature (TG) determined by the outdoor air temperature sensor 70 and an in-compartment air temperature (TR) determined by an in-compartment temperature sensor 76 are read.

At step SB2 subsequent to step SB1, it is determined whether or not the outdoor air temperature (TG) or the in-compartment air temperature (TR) is lower than 0° C. When it is determined as "NO" at step SB2, i.e., the outdoor air temperature (TG) or the in-compartment air temperature (TR) is equal to or higher than 0° C., the process proceeds to step SB3, and the operation mode of the heat pump device 20 is switched to the air-heating start-up operation mode.

Then, the process proceeds to step SB4, and it is determined whether or not a discharged air temperature determined by the discharged air temperature sensor 75 is higher than 30° C. When it is determined as "NO" at step SB4, i.e., the discharged air temperature is equal to or lower than 30° C., the determination as in step SB4 is repeatedly performed until the discharged air temperature reaches higher than 30° C. Meanwhile, the heat pump device 20 operates in the air-heating start-up operation mode.

When it is determined as "YES" at step SB4, i.e., the discharged air temperature is higher than 30° C., the process proceeds to step SB5, and the operation mode of the heat pump device 20 is switched to the normal air-heating operation mode.

The air conditioning control device 22 estimates, at steps SB2, SB4, whether or not the temperature of refrigerant on the high-pressure side in the heat pump device 20 is equal to or lower than a predetermined low temperature. That is, if the temperature of refrigerant on the high-pressure side in the heat pump device 20 is equal to or lower than the predetermined low temperature, the discharged air temperature is low. The "predetermined low temperature" in the present embodiment is a temperature at which the discharged air temperature is 30° C. When the discharged air temperature is higher than 30° C., it is estimated that the temperature of refrigerant on the high-pressure side in the heat pump device 20 is higher than the predetermined low temperature ("YES" at step SB4). On the other hand, when the discharged air temperature is equal to or lower than 30° C., it is estimated that the temperature of refrigerant on the high-pressure side in the heat pump device 20 is equal to or lower than the predetermined low temperature ("NO" at step SB4).

That is, the air conditioning control device 22 causes the high-pressure flow path switching device 50 to be in the air-heating start-up operation mode when it is estimated that the temperature of refrigerant on the high-pressure side in the heat pump device 20 is equal to or lower than the predetermined low temperature, and causes the high-pressure flow path switching device 50 to be in the normal air-heating operation mode when it is estimated that the temperature of refrigerant on the high-pressure side in the heat pump device 20 is higher than the predetermined low temperature.

When it is determined as "YES" at step SB2, i.e., the outdoor air temperature (TG) or the in-compartment air temperature (TR) is lower than 0° C., the process proceeds to step SB6, and the operation mode of the heat pump device 20 is switched to the air-heating start-up operation mode.

Subsequently, the process proceeds to step SB7, and it is determined whether or not the discharged air temperature determined by the discharged air temperature sensor 75 is higher than 30° C. When it is determined as "NO" at step SB7, i.e., the discharged air temperature is equal to or lower than 30° C., the determination as in step SB7 is repeated until the discharged air temperature reaches higher than 30° C. Meanwhile, the heat pump device 20 operates in the air-heating start-up operation mode.

When it is determined as "YES" at step SB7, i.e., the discharged air temperature is higher than 30° C., the process proceeds to step SB8, and the in-compartment air temperature (TR) is read. At step SB9 subsequent to step SB8, it is determined whether or not the in-compartment air temperature (TR) is lower than 20° C. If the in-compartment air temperature (TR) is equal to or higher than 20° C., the process proceeds to step SB5, and the operation mode of the heat pump device 20 is switched to the normal air-heating operation mode.

At steps SB7 to SB9, the air conditioning control device 22 estimates whether or not the temperature of refrigerant on the high-pressure side in the heat pump device 20 is equal to or lower than the predetermined low temperature.

At step SB9, when the in-compartment air temperature (TR) is lower than 20° C., the process proceeds to step SB10, and the operation mode of the heat pump device 20 is switched to the intermediate air-heating operation mode. Subsequently, the process proceeds to step SB11, and it is determined whether or not the surface temperature of the upstream indoor heat exchanger 32 determined by the upstream indoor heat exchanger temperature sensor 73 (equivalent to the temperature of outdoor air having passed through the upstream indoor heat exchanger 32) is higher than 50° C. When it is determined as "NO" at step SB11, i.e., the surface temperature of the upstream indoor heat exchanger 32 is equal to or lower than 50° C., the determination as in step SB11 is repeated until the surface temperature of the upstream indoor heat exchanger 32 reaches higher than 50° C. Meanwhile, the heat pump device 20 operates in the intermediate air-heating operation mode.

When it is determined as "YES" at step SB11, i.e., the surface temperature of the upstream indoor heat exchanger 32 is higher than 50° C., the process proceeds to step SB5, and the operation mode of the heat pump device 20 is switched to the normal air-heating operation mode.

That is, the air conditioning control device 22 switches the high-pressure flow path switching device 50 from the air-heating start-up operation mode to the intermediate air-heating operation mode before switching from the air-heating start-up operation mode to the normal air-heating operation mode, and then switches the high-pressure flow path switching device 50 from the intermediate air-heating operation mode to the normal air-heating operation mode.

During the air-heating operation mode, when a frosting determinator 22a determines that frost is formed on the outdoor heat exchanger 33, the operation mode of the heat pump device 20 is switched to the defrosting operation mode. Upon completion of defrosting, the heat pump device 20 is switched to the air-heating operation mode.

As just described, according to the fourth embodiment, it is assumed that the temperature of refrigerant on the high-pressure side is equal to or lower than the predetermined low temperature under the circumstances, such as the winter, that the outdoor air temperature is low and that refrigerant on the high-pressure side in the heat pump device 20 is cooled to a temperature close to the outdoor air temperature due to the vehicle being left uncontrolled for a long period of time. In such a case, the high-pressure flow path switching device 50 is in the air-heating start-up operation mode, and refrigerant having circulated in the downstream indoor heat exchanger 31 flows so as to bypass the upstream indoor heat exchanger 32. Thus, an increase in refrigerant pressure and refrigerant temperature on the high-pressure side in the heat pump device 20 accelerates, and therefore, start-up of air-heating becomes faster.

On the other hand, it is assumed that the temperature of refrigerant on the high-pressure side is higher than the predetermined low temperature under the circumstances after the lapse of the predetermined time from the beginning of the air-heating start-up operation mode. In this case, the high-pressure flow path switching device 50 is in the normal air-heating operation mode, and refrigerant having circulated in the downstream indoor heat exchanger 31 flows through the upstream indoor heat exchanger 32. Thus, since outdoor air can be heated by the downstream indoor heat exchanger 31 and the upstream indoor heat exchanger 32, a high air-heating capacity can be achieved. Consequently, according to the present embodiment, the degree of passenger's comfort can be improved.

Since the intermediate air-heating operation mode is provided, part of refrigerant can flow, before switching from the air-heating start-up operation mode to the normal air-heating operation mode, through the upstream indoor heat exchanger 32 while the remaining refrigerant can flow through the section other than the upstream indoor heat exchanger 32. This results in a slow change in refrigerant flow, and therefore, a high air-heating capacity can be achieved.

The air conditioning control device 22 may control, in the intermediate air-heating operation mode, the amount of refrigerant circulating in the downstream indoor heat exchanger 31 such that a change in temperature determined by the downstream indoor heat exchanger temperature sensor 74 falls within a predetermined range. That is, the high-pressure flow path switching device 50 is capable of optionally changing the amount of refrigerant circulating in the downstream indoor heat exchanger 31 and the amount of refrigerant circulating in the upstream indoor heat exchanger 32, and controls the amount of refrigerant circulating in the downstream indoor heat exchanger 31 such that the surface temperature of the downstream indoor heat exchanger 31 is higher than, e.g., 50° C. This can adjust the flow rate of refrigerant in each of the downstream indoor heat exchanger 31 and the upstream indoor heat exchanger 32 without significantly decreasing the temperature of outdoor air having passed through the downstream indoor heat exchanger 31, and therefore, the degree of passenger's comfort can be further improved.

The air conditioning control device 22 may control, in the intermediate air-heating operation mode, the amount of refrigerant circulating in the upstream indoor heat exchanger 32 such that a change in pressure, which is determined by the high-pressure refrigerant pressure sensor 72, of refrigerant circulating in the downstream indoor heat exchanger 31 falls within a predetermined range. That is, the amount of refrigerant circulating in the downstream indoor heat exchanger 31 is controlled such that the pressure of refrigerant circulating in the downstream indoor heat exchanger 31 is, e.g., equal to or higher than 1 MPa. This can adjust the flow rate of refrigerant in each of the downstream indoor heat exchanger 31 and the upstream indoor heat exchanger 32 without significantly decreasing the temperature of outdoor air having passed through the downstream indoor heat exchanger 31, and therefore, the degree of passenger's comfort can be further improved.

The air conditioning control device 22 may control, in the intermediate air-heating operation mode, the amount of refrigerant circulating in the upstream indoor heat exchanger 32 such that a change in temperature determined by the discharged air temperature sensor 75 falls within a predetermined range. That is, the amount of refrigerant circulating in the downstream indoor heat exchanger 31 is controlled such that the temperature determined by the discharged air temperature sensor 75 reaches, e.g., equal to or higher than 30° C. This can adjust the flow rate of refrigerant in each of the downstream indoor heat exchanger 31 and the upstream indoor heat exchanger 32 without significantly decreasing the temperature of outdoor air having passed through the downstream indoor heat exchanger 31, and therefore, the degree of passenger's comfort can be further improved.

The air conditioning control device 22 may switch the high-pressure flow path switching device 50 from the intermediate air-heating operation mode to the normal air-heating operation mode when it is determined that the temperature determined by the upstream indoor heat exchanger temperature sensor 73 is equal to or higher than a predetermined temperature. That is, when the temperature determined by the upstream indoor heat exchanger temperature sensor 73 is, e.g., equal to or higher than 50° C., it can be assumed that the temperature and pressure of refrigerant on the high-pressure side is sufficiently increased. In such a state, the high-pressure flow path switching device 50 can be switched to the normal air-heating operation mode to enhance the air-heating capacity.

The air conditioning control device 22 may switch the high-pressure flow path switching device 50 from the intermediate air-heating operation mode to the normal air-heating operation mode when it is determined that the pressure determined by the upstream indoor heat exchanger pressure sensor 77 is equal to or higher than a predetermined pressure. That is, when the pressure of refrigerant circulating in the upstream indoor heat exchanger 32 is, e.g., equal to or higher than 1 MPa, it can be assumed that the pressure of refrigerant on the high-pressure side is sufficiently increased. In such a state, the high-pressure flow path switching device 50 can be switched to the normal air-heating operation mode to enhance the air-heating capacity.

The air conditioning control device 22 may switch the flow path switching device from the intermediate air-heating operation mode to the normal air-heating operation mode when it is determined that the discharged air temperature determined by the discharged air temperature sensor 75 is equal to or higher than a predetermined temperature. That is, when the discharged air temperature determined by the discharged air temperature sensor 75 is, e.g., equal to or higher than 30° C., it can be assumed that the pressure of refrigerant on the high-pressure side is sufficiently increased. In such a state, the flow path switching device can be switched to the normal air-heating operation mode to enhance the air-heating capacity.

When it is estimated that the temperature and pressure of refrigerant on the high-pressure side are equal to or higher than predetermined temperature and pressure based on the determined rotational speed of the electric compressor 30, the air-heating start-up operation mode may be switched to the normal air-heating operation mode, the air-heating start-up operation mode may be switched to the intermediate air-heating operation mode, or the intermediate air-heating operation mode may be switched to the normal air-heating operation mode.

Figure 15:
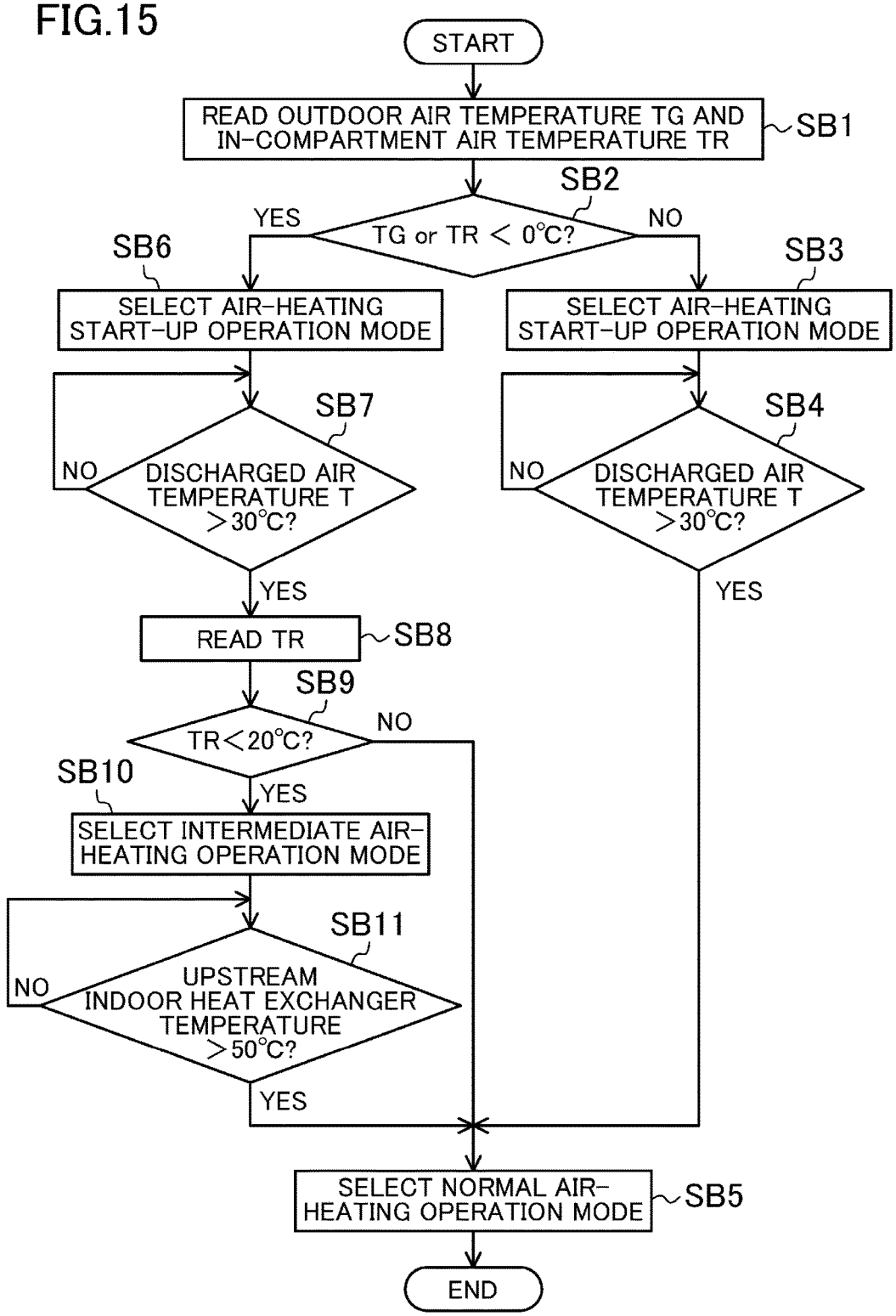
FIG. 15 is a flowchart showing the steps of an air-heating subroutine control of the fourth embodiment.

At steps SB4, SB7 of the flowchart shown in FIG. 15, the determination is made on the discharged air temperature (T). Instead of the discharged air temperature (T), it may be determined whether or not the temperature determined by the downstream indoor heat exchanger temperature sensor 74 is higher than, e.g., 50° C., or it may be determined whether or not the refrigerant pressure determined by the high-pressure refrigerant pressure sensor 72 is higher than, e.g., 1 MPa.

Fifth Embodiment

Figure 16:
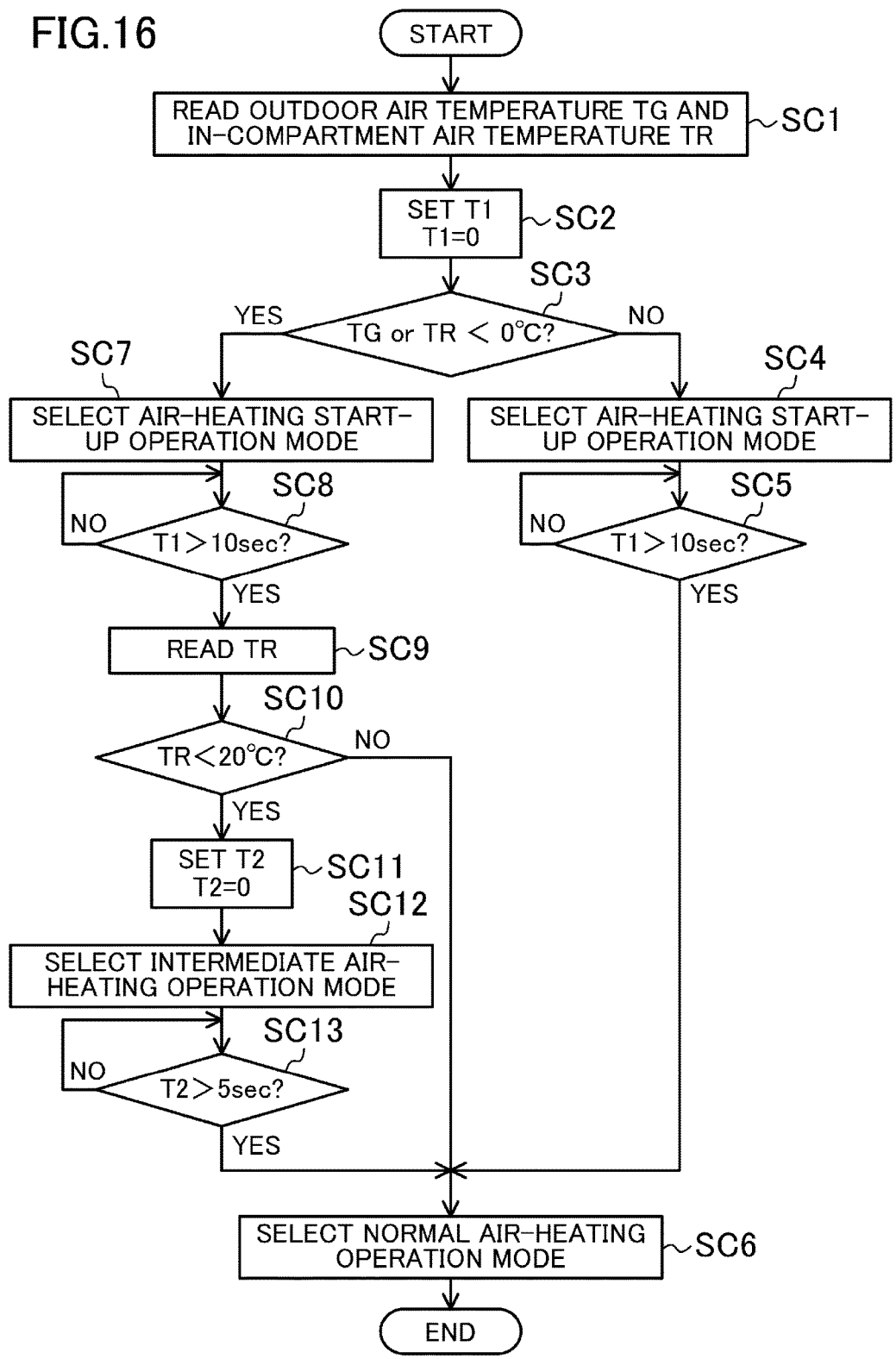
FIG. 16 is a flowchart showing the steps of an air-heating subroutine control of a fifth embodiment.

FIG. 16 is a flowchart showing the steps of an air-heating subroutine control of a fifth embodiment of the present invention. The fifth embodiment is similar to the fourth embodiment except for the steps of the air-heating subroutine control. The same reference numerals as those described in the fourth embodiment are used to represent equivalent elements in the fifth embodiment, and the description thereof will not be repeated. Differences between the fourth and fifth embodiments will be described in detail.

At step SC1 of the flowchart shown in FIG. 16, an outdoor air temperature (TG) determined by an outdoor air temperature sensor 70 and an in-compartment air temperature (TR) determined by an in-compartment temperature sensor 76 are read.

At step SC2 subsequent to step SC1, a first timer T1 is set to begin counting. Then, the process proceeds to step SC3, and it is determined whether or not the outdoor air temperature (TG) or the in-compartment air temperature (TR) is lower than 0° C. When it is determined as "NO" at step SC3, i.e., the outdoor air temperature (TG) or the in-compartment air temperature (TR) is equal to or higher than 0° C., the process proceeds to step SC4, and the operation mode of a heat pump device 20 is switched to an air-heating start-up operation mode.

At step SC5 subsequent to step SC4, it is determined whether or not 10 seconds have elapsed since the first timer T1 began counting. When it is determined as "NO" at step SC5, i.e., 10 seconds have not elapsed since the first timer T1 began counting, step SC5 is repeated until 10 seconds have elapsed. When it is determined as "YES" at step SC5, i.e., 10 seconds have elapsed since the first timer T1 began counting, the process proceeds to step SC6, and the operation mode of the heat pump device 20 is switched to a normal air-heating operation mode.

At steps SC3, SC5, an air conditioning control device 22 estimates whether or not the temperature of refrigerant on a high-pressure side in the heat pump device 20 is equal to or lower than a predetermined low temperature. That is, it is estimated that the temperature of refrigerant on the high-pressure side in the heat pump device 20 is equal to or lower than the predetermined low temperature until a certain amount of time has elapsed after the beginning of the air-heating start-up operation mode, and the air-heating start-up operation mode is continued. On the other hand, when the certain amount of time has elapsed after the beginning of the air-heating start-up operation mode, it is estimated that the temperature of refrigerant on the high-pressure side in the heat pump device 20 is higher than the predetermined low temperature, and the air-heating start-up operation mode is switched to the normal air-heating operation mode.

That is, the air conditioning control device 22 causes a high-pressure flow path switching device 50 to be in the air-heating start-up operation mode when it is estimated that the temperature of refrigerant on the high-pressure side in the heat pump device 20 is equal to or lower than the predetermined low temperature, and causes the high-pressure flow path switching device 50 to be in the normal air-heating operation mode when it is estimated that the temperature of refrigerant on the high-pressure side in the heat pump device 20 is higher than the predetermined low temperature.

When it is determined as "YES" at step SC3, i.e., the outdoor air temperature (TG) or the in-compartment air temperature (TR) is lower than 0° C., the process proceeds to step SC7, and the operation mode of the heat pump device 20 is switched to the air-heating start-up operation mode.

At step SC8 subsequent to step SC7, it is determined whether or not 10 seconds have elapsed since the first timer T1 began counting. When it is determined as "NO" at step SC8, i.e., 10 seconds have not elapsed since the first timer T1 began counting, step SC8 is repeated until 10 seconds have elapsed. When it is determined as "YES" at step SC8, i.e., 10 seconds have elapsed since the first timer T1 began counting, the process proceeds to step SC9, and the in-compartment air temperature (TR) is read.

Then, the process proceeds to step SC10, and it is determined whether or not the in-compartment air temperature (TR) is lower than 20° C. When it is determined as "NO" at step SC10, i.e., the in-compartment air temperature (TR) is equal to or higher than 20° C., the process proceeds to step SC6, and the operation mode of the heat pump device 20 is switched to the normal air-heating operation mode.

When it is determined as "YES" at step SC10, i.e., the in-compartment air temperature (TR) is lower than 20° C., the process proceeds to step SC11, and a second timer T2 is set to begin counting.

At step SC12 subsequent to step SC11, the operation mode of the heat pump device 20 is switched to an intermediate air-heating operation mode. Subsequently, the process proceeds to step SC13, and it is determined whether or not 5 seconds have elapsed since the second timer T2 began counting. When it is determined as "NO" at step SC13, i.e., 5 seconds have not elapsed since the second timer T2 began counting, step SC13 is repeated until 5 seconds have elapsed. When it is determined as "YES" at step SC13, i.e., 5 seconds have elapsed since the second timer T2 began counting, the process proceeds to step SC6, and the operation mode of the heat pump device 20 is switched to the normal air-heating operation mode.

As just described, according to the fifth embodiment, it is assumed that the temperature of refrigerant on the high-pressure side in the heat pump device 20 is equal to or lower than the predetermined low temperature under the circumstances that refrigerant on the high-pressure side is cooled to a temperature close to the outdoor air temperature. In such a case, the high-pressure flow path switching device 50 is in the air-heating start-up operation mode, and refrigerant having circulated in a downstream indoor heat exchanger 31 flows so as to bypass an upstream indoor heat exchanger 32. Thus, an increase in refrigerant pressure and refrigerant temperature on the high-pressure side in the heat pump device 20 accelerates, and therefore, start-up of air-heating becomes faster.

Under the circumstances that the predetermined time has elapsed after start-up of air-heating, it is assumed that the temperature of refrigerant on the high-pressure side is higher than the predetermined low temperature. In such a case, the high-pressure flow path switching device 50 is in the normal air-heating operation mode, and refrigerant having circulated in the downstream indoor heat exchanger 31 flows through the upstream indoor heat exchanger 32. Thus, since outdoor air can be heated by the downstream indoor heat exchanger 31 and the upstream indoor heat exchanger 32, a high air-heating capacity can be achieved. Thus, according to the present embodiment, the degree of passenger's comfort can be improved.

In the fourth and fifth embodiments, the heat pump device 20 is also switched to the air-cooling operation mode, but the present invention is not limited to such a configuration. No air-cooling operation mode may be available.

In estimating whether or not the temperature of refrigerant on the high-pressure side in the heat pump device 20 is equal to or lower than the predetermined low temperature, such estimation may be made based on the output value of the temperature sensor determining the temperature of refrigerant on the high-pressure side, may be made by determining the pressure of refrigerant on the high-pressure side, or may be made based on the time elapsed after the beginning of air-heating. An estimation method is not limited.

In the first and second embodiments, it is estimated whether or not the temperature of refrigerant on the high-pressure side in the heat pump device 20 is equal to or lower than the predetermined low temperature. The high-pressure flow path switching device 50 operates in the air-heating start-up operation mode when it is estimated that the temperature of refrigerant on the high-pressure side in the heat pump device 20 is equal to or lower than the predetermined low temperature, and operates in the normal air-heating operation mode when it is estimated that the temperature of refrigerant on the high-pressure side in the heat pump device 20 is higher than the predetermined low temperature. However, the present invention is not limited to such a configuration. For example, the high-pressure flow path switching device 50 may be normally in the air-heating start-up operation mode regardless of the state of refrigerant on the high-pressure side, and then, the high-pressure flow path switching device 50 may be switched to the normal air-heating operation mode when a predetermined period of time has elapsed or when the pressure of refrigerant on the high-pressure side increases to a predetermined pressure.

In the foregoing embodiments, it has been described that the vehicle air conditioner 1 is mounted on the electric vehicle. However, the present invention is not limited to such a configuration. The vehicle air conditioner 1 may be mounted on, e.g., a hybrid vehicle including an engine and a motor for running the vehicle.

INDUSTRIAL APPLICABILITY

As described above, the vehicle air conditioner of the present invention can be mounted on, e.g., an electric vehicle or a hybrid vehicle.

DESCRIPTION OF REFERENCE CHARACTERS

1 Vehicle Air Conditioner
20 Heat Pump Device
21 Indoor Air Conditioning Unit
22 Air Conditioning Control Device
22a Frosting Determinator
30 Electric Compressor (Compressor)
31 Downstream Indoor Heat Exchanger (First Indoor Heat Exchanger)
32 Upstream Indoor Heat Exchanger (Second Indoor Heat Exchanger)
33 Outdoor Heat Exchanger
40-43 First to Fourth Main Refrigerant Pipes
44-46 First to Third Branched Refrigerant Pipes
50 High-Pressure Flow Path Switching Device (Flow Path Switching Device)
61 Air Heater
62 Air Mix Door (Temperature Adjustment Door)
65 Air Blower
70 Outdoor Air Temperature Sensor
72 High-Pressure Refrigerant Pressure Sensor (First Pressure Sensor)
73 Upstream Indoor Heat Exchanger Temperature Sensor (Second Temperature Sensor)
74 Downstream Indoor Heat Exchanger Temperature Sensor (First Temperature Sensor)
77 Upstream Indoor Heat Exchanger Sensor (Second Pressure Sensor, Refrigerant Pressure Sensor, Refrigerant Temperature Sensor)

The invention claimed is:

1. A vehicle air conditioner comprising:
a heat pump device including
  a compressor configured to compress refrigerant,
  first and second indoor heat exchangers arranged in a vehicle compartment, and
  an outdoor heat exchanger connected to the second indoor heat exchanger by a refrigerant pipe on a downstream side in a flow direction of the refrigerant of the second indoor heat exchanger, and disposed outside the vehicle compartment;
a flow path switching device disposed in the refrigerant pipe;
an expansion valve disposed in the refrigerant pipe between the outdoor heat exchanger and the flow path switching device; and
an indoor air conditioning unit
  housing the first and second indoor heat exchangers, including an air blower configured to send air-conditioning air to the first and second indoor heat exchangers, and
  configured to generate air-conditioned air to supply the air-conditioned air into the vehicle compartment, the refrigerant pipe, to which high-temperature refrigerant discharged from the compressor is supplied, being connected to the first indoor heat exchanger;
the flow path switching device
  including a refrigerant inlet into which refrigerant flows from the first indoor heat exchanger, a normal air-heating refrigerant outlet connected to the second indoor heat exchanger such that the refrigerant flowing into the refrigerant inlet flows into the second indoor heat exchanger, and an air-heating start-up refrigerant outlet causing the refrigerant flowing into the refrigerant inlet to bypass the second indoor heat exchanger,
  configured to switch between a normal air-heating mode in which the refrigerant flowing into the refrigerant inlet flows into the normal air-heating refrigerant outlet and an air-heating start-up mode in which the refrigerant flowing into the refrigerant inlet flows into the air-heating start-up refrigerant outlet, and connecting a refrigerant outlet of the first indoor heat exchanger, a refrigerant inlet of the second indoor heat exchanger, and a refrigerant inlet of the expansion valve together; and an air conditioning control device configured to control the flow path switching device, wherein the expansion valve has the refrigerant inlet located downstream of a joining portion of a pipe connected to the air-heating start-up refrigerant outlet of the flow path switching device and a pipe connected to the refrigerant outlet of the second indoor heat exchanger, the air conditioning control device is configured to cause the flow path switching device to be in the air-heating start-up mode at beginning of air-heating and then to be in the normal air-heating mode, and to allow the refrigerant that has been discharged from the compressor, flowed into the first indoor heat exchanger, and then discharged from the first indoor heat exchanger in the air-heating start-up mode and the refrigerant that has been discharged from the compressor, sequentially flowed into the first indoor heat exchanger and the second indoor heat exchanger, and then discharged from the second indoor heat exchanger in the normal air-heating mode to selectively flow into the expansion valve, in the air-heating start-up mode, a flow of the refrigerant into the second indoor heat exchanger is blocked, and in the air-heating start-up mode and the normal air-heating mode, the refrigerant flows into the outdoor heat exchanger, and the outdoor heat exchanger serves as a heat absorber.

2. The vehicle air conditioner of claim 1, wherein the flow path switching device is switchable to an intermediate mode in which the refrigerant flowing into the refrigerant inlet flows into the normal air-heating refrigerant outlet and the air-heating start-up refrigerant outlet, and the air conditioning control device is configured to switch the flow path switching device from the air-heating start-up mode to the intermediate mode before switching of the flow path switching device from the air-heating start-up mode to the normal air-heating mode, and then, switch the flow path switching device from the intermediate mode to the normal air-heating mode.

* * * * *